(12) United States Patent
Mercer

(10) Patent No.: US 11,011,991 B1
(45) Date of Patent: May 18, 2021

(54) REGULATION LOOP CIRCUIT

(71) Applicant: Dialog Semiconductor (UK) Limited, London (GB)

(72) Inventor: Mark Mercer, Phoenix, AZ (US)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/705,176

(22) Filed: Dec. 5, 2019

(51) Int. Cl.
| | |
|---|---|
| *H02M 3/06* | (2006.01) |
| *H02M 3/07* | (2006.01) |
| *H02M 3/155* | (2006.01) |
| *H02M 3/145* | (2006.01) |
| *H02M 3/158* | (2006.01) |

(52) U.S. Cl.
CPC ............ *H02M 3/1584* (2013.01); *H02M 3/06* (2013.01); *H02M 3/07* (2013.01); *H02M 3/145* (2013.01); *H02M 3/155* (2013.01)

(58) Field of Classification Search
CPC .......... H02M 3/06; H02M 3/07; H02M 3/145; H02M 3/155
USPC .................................. 323/271, 282; 327/536
See application file for complete search history.

(56) References Cited

U.S. PATENT DOCUMENTS

| | | | |
|---|---|---|---|
| 9,559,589 B2 | 1/2017 | Petersen | |
| 2009/0278520 A1* | 11/2009 | Perreault | H02M 3/07 |
| | | | 323/282 |
| 2014/0240034 A1* | 8/2014 | Myles | H02M 3/07 |
| | | | 327/536 |
| 2017/0055322 A1* | 2/2017 | Jiang | H02M 3/07 |
| 2017/0302093 A1 | 10/2017 | Petersen | |
| 2018/0166902 A1* | 6/2018 | Huang | H02M 3/158 |
| 2018/0175726 A1 | 6/2018 | Petersen et al. | |
| 2018/0358896 A1* | 12/2018 | Puggelli | H02M 3/1588 |

OTHER PUBLICATIONS

"Zero Inductor Voltage Multilevel Bus Converter," by Samuel Webb et al., 2018 IEEE Applied Power Electronics Conference and Exposition (APEC), Mar. 4-8, 201, pp. 2175-2182.
"A Three-Level Single-Inductor Triple-Output Converter with an Adjustable Flying-Capacitor Technique for Low Output Ripple and Fast Transient Response," by Li-Cheng Chu et al., 2017 IEEE International Solid-State Circuits Conference (ISSCC), Feb. 5-9, 2017, pp. 186-188.

(Continued)

*Primary Examiner* — Gary A Nash
(74) *Attorney, Agent, or Firm* — Saile Ackerman LLC; Stephen B. Ackerman

(57) ABSTRACT

A regulation loop circuit and a method for a buck converter for receiving an input voltage and providing an output voltage are presented. The buck converter has a capacitive divider coupled to the input terminal and comprising a first capacitor, a second capacitor, and a plurality of switches. An inductor is coupled to the capacitive divider at a switching node and is coupled to the output terminal. The regulation loop circuit is coupled to the output terminal and a reference voltage. The loop regulates the output voltage based on the reference voltage by i) regulating a switching node voltage by switching the buck converter through a plurality of phases. and ii) maintaining an approximately equal duration for each phase.

23 Claims, 19 Drawing Sheets

1. CMID removed
2. M5 shorted
3. Inductor added

(56) References Cited

OTHER PUBLICATIONS

"A 50MHz 5V 3W 90% Efficiency 3-Level Buck Converter with Real-Time Calibration and Wide Output Range for Fast-DVS in 65nm CMOS," by Xun Liu et al., 2016 IEEE Symposium on VLSI Circuits (VLSI-Circuits), Jun. 15-17, 2016, 2 pages.

"A 2MHz 12-to-100V 90%-Efficiency Self-Balancing ZVS Three-Level DC-DC Regulator with Constant-Frequency AOT $V^2$ Control and 5ns ZVS Turn-On Delay," by Jung Xue et al., 2016 IEEE International Solid-State Circuits Conference (ISSCC), Jan. 31, 2016, pp. 226-228.

"Three-Level Buck Converter for Envelope Tracking in RF Power Amplifiers," by Vahid Yousefzadeh et al., Twentieth Annual IEEE Applied Power Electronics Conference and Exposition, 2005, APEC 2005, Mar. 6-10, 2005, pp. 1588-1594.

U.S. Notice of Allowance, U.S. Appl. No. 16/705,171, Applicant: Mihail Jefremow, dated Jan. 26, 2021, 14 pages.

U.S. Notice of Allowance, U.S. Appl. No. 16/705,171, Applicant: Mihail Jefremow, dated Nov. 16, 2020, 13 pages.

\* cited by examiner

| Parameter | 2-Level Buck | Buck converter 200 | Buck converter 300 |
|---|---|---|---|
| Inductor L | 470nH | 470nH | 470nH |
| VBAT ESR | 50mOhm | 50mOhm | 50mOhm |
| CIN & ESR | 100uF, 2mOhm | 100uF, 2mOhm | 100uF, 2mOhm |
| COUT & ESR | 100uF, 10mOhm | 100uF, 10mOhm | 100uF, 10mOhm |
| CFLY1 & ESR | n/a | 60uF, 2mOhm | 60uF, 2mOhm |
| CFLY2 & ESR | n/a | 60uF, 2mOhm | 60uF, 2mOhm |
| FET $R_{ON}$ | 20mOhm (x2) | 20mOhm (x7) | 20mOhm (x7) |
| $T_{SW}$ | 1.5us | n/a | 3us (effective) |
| Fixed $T_{ON}$ | n/a | 3u | n/a |

FIG. 19

REGULATION LOOP CIRCUIT

The present disclosure relates to a regulation loop circuit. In particular the present disclosure relates to a regulation loop circuit for a buck converter.

BACKGROUND

A buck converter is a power converter that is used to step down an input voltage VIN to provide an output voltage VOUT, where the output voltage VOUT is less than the input voltage VIN. The relation between the voltages may be described by the conversion ratio of the buck converter where the conversion ratio (CR) is equal to the output voltage VOUT divided by the input voltage VIN, as follows:

$$CR = \frac{VOUT}{VIN} \quad (1)$$

It will be appreciated that the conversion ratio may be expressed as a percentage (for example, 25%), as a number (for example 0.25) or as a ratio (for example 4:1, being representative of 25%). The conversion ratio may also be referred to as a step-down ratio to indicate that the input voltage VIN is being "stepped-down" to provide the output voltage VOUT.

A 3-level multi-level converter (MLC) buck can provide much better efficiency than a 2-level buck when the conversion ratio is around 50%. However, when the application requires the conversion ratio to be in a lower range (for example, 0.25 CR>0), the efficiency of a 3-level MLC buck becomes comparable to the efficiency of a 2-level buck.

The similarity in efficiency for the 3-level MLC buck and the 2-level buck for conversion ratios between 25% and 0% is a result of the following:
1. the difference in the inductor current ripple between the 3-level MLC buck and the 2-level buck is reduced for smaller conversion ratios, when compared to conversion ratios at or near 50%; and
2. the 3-level MLC has two power switches in series with the inductor during a magnetization phase whereas the 2-level buck has only one power switch in series with the inductor during a magnetization phase.

FIG. 1 is a schematic of a hybrid switched capacitor (SC) power converter 100 from: Samuel Webb et. al., Zero Inductor Voltage Multilevel Bus Converter, IEEE Applied Power Electronics Conference and Exposition (APEC), pp. 2175-2182, IEEE 2018. The hybrid SC power converter 100 is a 4:1 2-stage SC converter. The current paths for the switch on-states are indicated in the Figure.

The hybrid SC power converter 100 is well suited to provide high efficiency when the application requires a 4:1 conversion ratio. However, it cannot provide any other conversion ratio because it operates in an unregulated (i.e., open loop) manner. Each switch state operates with equal duration.

The hybrid SC power converter 100 comprises a power supply 102; switches 104, 106, 108, 110, 112, 114, 116, 118; capacitors 120, 122, 124, 126 and is coupled to a load 128. Although illustrated as a battery, it will be appreciated that any suitable power supply may be used for the power supply 102.

SUMMARY

It is desirable to provide a buck converter that provides high efficiency power conversion in the conversion ratio range of 0% to 25%.

According to a first aspect of the disclosure there is provided a regulation loop circuit for a buck converter for receiving an input voltage at an input terminal and providing an output voltage at an output terminal, the buck converter comprising a capacitive divider coupled to the input terminal and comprising a first capacitor, a second capacitor, and a plurality of switches, and an inductor comprising a first terminal coupled to the capacitive divider at a switching node, and a second terminal coupled to the output terminal, wherein the regulation loop circuit is configurable to be coupled to the output terminal and a reference voltage, and to regulate the output voltage based on the reference voltage by i) regulating a switching node voltage at the switching node by switching the buck converter through a plurality of phases, comprising a first phase, a second phase and a third phase by selectively operating the plurality of switches to provide a first capacitor voltage across the first capacitor and a second capacitor voltage across the second capacitor, and ii) maintaining an approximately equal duration for each of the first phase, the second phase and the third phase with respect to each other irrespective of the reference voltage, wherein during the first phase, the second phase and the third phase the inductor is magnetized.

Optionally, the switching node voltage in each phase is dependent on a switching state of one or more of the switches, the first capacitor voltage and the second capacitor voltage.

Optionally, the inductor is magnetized when the switching node voltage is greater than the output voltage.

Optionally, the plurality of phases comprises a fourth phase.

Optionally, the inductor is demagnetized in the fourth phase.

Optionally, the inductor is demagnetized when the switching node voltage is less than the output voltage.

Optionally, the second capacitor voltage is approximately equal to half of the first capacitor voltage.

Optionally, the first capacitor voltage is approximately equal to half of the input voltage and the second capacitor voltage is approximately equal to a quarter of the input voltage.

Optionally, the regulation loop circuit is configured to operate the buck converter in a constant current mode (CCM) or a constant conduction mode.

Optionally, the regulation loop circuit is configured to regulate the output voltage to be between approximately one quarter of the input voltage and zero volts.

Optionally, the plurality of switches comprises a first switch, a second switch, a third switch, a fourth switch, a fifth switch, a sixth switch and a seventh switch, wherein a first terminal of the first capacitor is coupled to the input terminal via the first switch when the first switch is in a closed state and is coupled to a first terminal of the second capacitor via the second switch when the second switch is in a closed state, a second terminal of the first capacitor is coupled to the first terminal of the second capacitor via the third switch when the third switch is in a closed state and is coupled to a voltage terminal via the fourth switch when the fourth switch is in a closed state, the first terminal of the second capacitor is coupled to the switching node when via the fifth switch when the fifth switch is in a closed state, and a second terminal of the second capacitor is coupled to the switching node via the sixth switch when the sixth switch is in a closed state and is coupled to the voltage terminal via the seventh switch when the seventh switch is in a closed state.

Optionally, during the first phase a first terminal of the first capacitor is coupled to the input terminal, a second terminal of the first capacitor is coupled to a first terminal of the second capacitor, and a second terminal of the second capacitor is coupled to the switching node, during the second phase, the first terminal of the first capacitor is coupled to the first terminal of the second capacitor, the second terminal of the first capacitor is coupled to a voltage terminal, and the second terminal of the second capacitor is coupled to the switching node, during the third phase, the first terminal of the first capacitor is floating, the second terminal of the first capacitor is coupled to the voltage terminal, the first terminal of the second capacitor is coupled to the switching node and the second terminal of the second capacitor is coupled to the voltage terminal, and during the fourth phase, the first capacitor and the second capacitor have their first terminals floating and their second terminals coupled to the voltage terminal, and the switching node is coupled to the voltage terminal.

Optionally, the regulation loop circuit of claim 1 is configured to switch the between phases in a sequence as follows the first phase, the fourth phase, the third phase, the fourth phase, the second phase, the fourth phase, the third phase and the fourth phase, wherein the sequence is repeated.

Optionally, the regulation loop circuit is configured to provide a plurality of control signals, wherein each control signal is provided to at least one of the plurality of switches and each control signal is suitable for setting a state of a switch, thereby selectively operating the plurality of switches.

Optionally, the regulation loop circuit comprises a pulse width modulation circuit configured to receive the output voltage and the reference voltage and to generate a pulse width modulation signal, and control logic configured to receive the pulse width modulation signal and to generate a logic output signal, wherein the plurality of control signals is dependent on the logic output signal.

Optionally, the pulse width modulation circuit comprises an error amplifier comprising a first input coupled to the output voltage terminal and comprising a second input coupled to the reference voltage, a ramp generator for generating a ramp signal, and a comparator comprising a first input coupled to the ramp generator and comprising a second input coupled to an output of the error amplifier, wherein the control logic receives the pulse width modulation signal from an output of the comparator.

Optionally, the regulation loop circuit comprises gate driver circuitry configured to receive the logic output signal from an output of the control logic and to provide the plurality of control signals.

Optionally, the regulation loop circuit is configured to receive a clock signal, the first phase, the second phase and the third phase are initiated by the clock signal, and the first phase, the second phase and the third phase are terminated by the pulse width modulation signal.

Optionally, the plurality of phases comprises a fourth phase.

Optionally, the regulation loop circuit is configured to receive a clock signal, and the fourth phase is initiated by the pulse width modulation signal and terminated by the clock signal.

Optionally, the regulation loop circuit is configured to receive a clock signal from a clock generator, the first phase, the second phase and the third phase are initiated by the clock signal, the first phase, the second phase and the third phase are terminated by the pulse width modulation signal, and the fourth phase is initiated by the pulse width modulation signal and terminated by the clock signal.

Optionally, the ramp generator comprises a latch circuit comprising a set input coupled to the output of the comparator and a reset input coupled the clock generator for receiving the clock signal, wherein the latch circuit provides an output that resets the ramp signal when the pulse width modulation signal switches to a high state and triggers the ramp signal when the clock signal switches to a high state.

According to a second aspect of the disclosure there is provided a buck converter for receiving an input voltage at an input terminal and providing an output voltage at an output terminal, the buck converter comprising a capacitive divider coupled to the input terminal and comprising a first capacitor, a second capacitor, and a plurality of switches, an inductor comprising a first terminal coupled to the capacitive divider at a switching node, and a second terminal coupled to the output terminal, and a regulation loop circuit that is configurable to be coupled to the output terminal and a reference voltage, and to regulate the output voltage based on the reference voltage by i) regulating a switching node voltage at the switching node by switching the buck converter through a plurality of phases, comprising a first phase, a second phase and a third phase by selectively operating the plurality of switches to provide a first capacitor voltage across the first capacitor and a second capacitor voltage across the second capacitor, and ii) maintaining an approximately equal duration for each of the first phase, the second phase and the third phase with respect to each other irrespective of the reference voltage, wherein during the first phase, the second phase and the third phase the inductor is magnetized.

It will be appreciated that the buck converter of the second aspect may include features set out in the first aspect and can incorporate other features as described herein.

According to a third aspect of the disclosure there is provided a method of regulating a buck converter for receiving an input voltage at an input terminal and providing an output voltage at an output terminal, using a regulation loop circuit, the buck converter comprising a capacitive divider coupled to the input terminal and comprising a first capacitor, a second capacitor, and a plurality of switches, and an inductor comprising a first terminal coupled to the capacitive divider at a switching node, and a second terminal coupled to the output terminal; wherein the method comprises regulating the output voltage based on the reference voltage by i) regulating a switching node voltage at the switching node by switching the buck converter through a plurality of phases, comprising a first phase, a second phase and a third phase by selectively operating the plurality of switches to provide a first capacitor voltage across the first capacitor and a second capacitor voltage across the second capacitor, and ii) maintaining an approximately equal duration for each of the first phase, the second phase and the third phase with respect to each other irrespective of the reference voltage, wherein during the first phase, the second phase and the third phase the inductor is magnetized.

It will be appreciated that method of the third aspect may include features set out in the first aspect and can incorporate other features as described herein.

BRIEF DESCRIPTION OF THE DRAWINGS

The disclosure is described in further detail below by way of example and with reference to the accompanying drawings, in which:

FIG. 19 is a table showing the simulation parameters used for the simulations of FIG. 18.

DESCRIPTION

Figure 1:
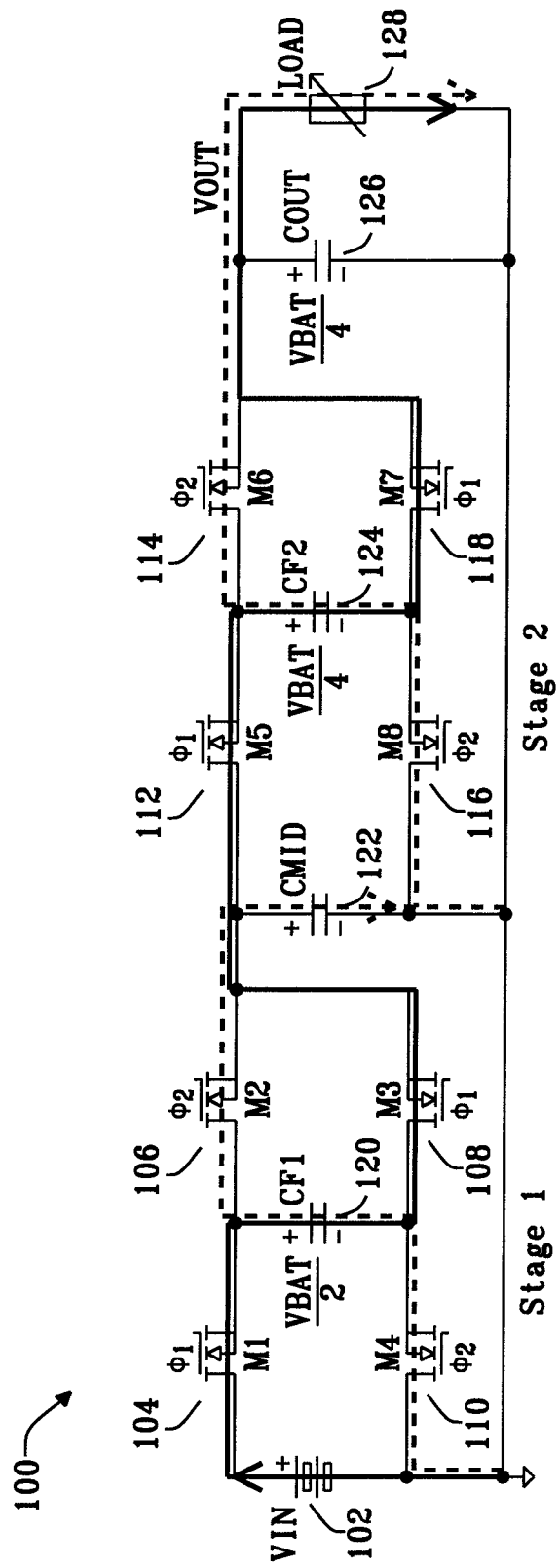
FIG. 1 is a schematic of a hybrid switched capacitor (SC) power converter of the prior art.
Figure 2:
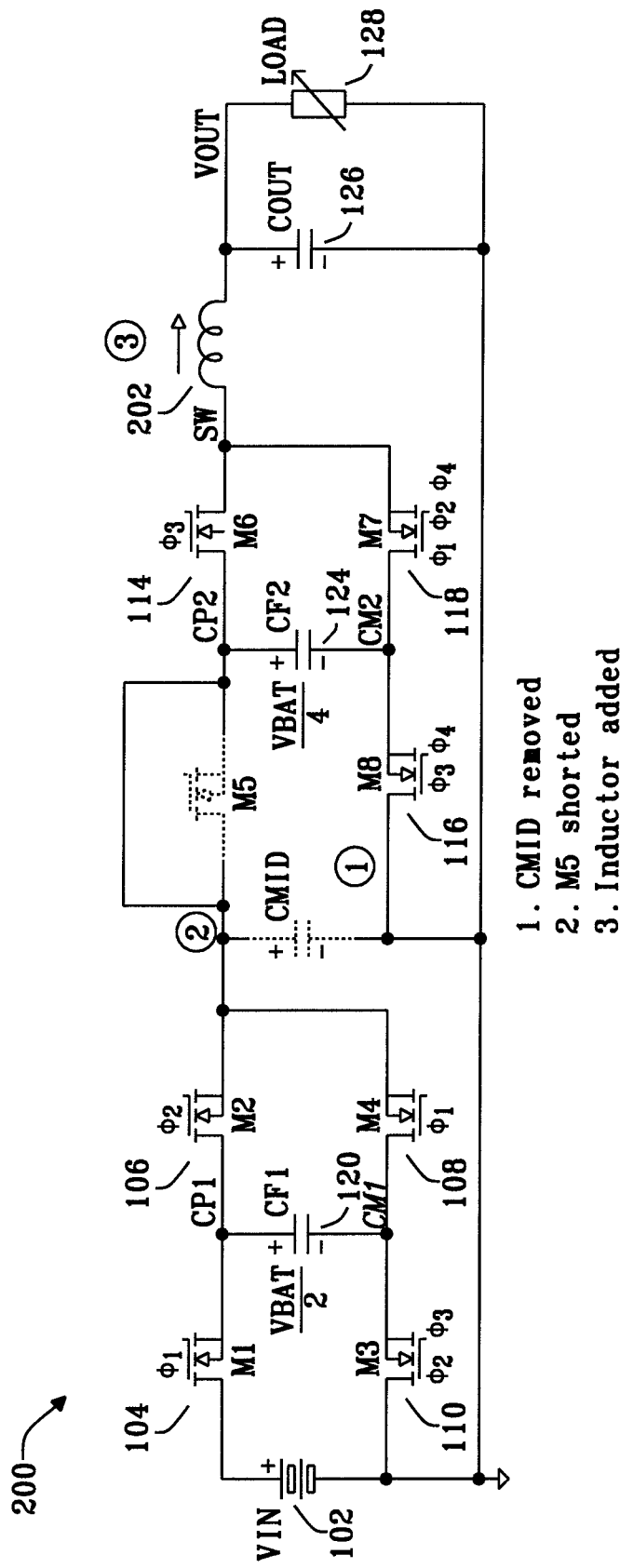
FIG. 2 is a schematic of a buck converter that is a modified version of the circuit of FIG. 1.

FIG. 2 is a schematic of a buck converter 200 that is a modified version of the hybrid SC power converter 100 of FIG. 1. The buck converter 200 may be referred to as a hybrid buck converter. The topology of the hybrid SC power converter 100 is modified to provide the buck converter 200 by the addition of an inductor 202, the removal of the capacitor 122 and the shorting of the switch 112. The buck converter 200 operates with additional switches phases compared with the hybrid SC power converter 100. Common reference numerals and variables between Figures represents common features.

The output voltage VOUT of the buck converter 200 is regulated by a constant-on time (COT) control scheme and as such can provide conversion ratios equal to 25% or smaller. The control scheme requires that the converter to operate in discontinuous conduction mode (DCM) only. Silicon results have demonstrated that the buck converter 200 is an effective solution for light load operation. However, due to the COT and forced OA valley inductor aspects of the control scheme, the inductor current ripple will be excessively high for heavy load operation. This will lead to excessive inductor AC and RMS losses.

It will be clear to the skilled person that "heavy load" and "light load" are in reference to the current drawn from the buck converter 200 by the load 128, with light load corresponding to a smaller current draw that the heavy load.

It is desirable to provide a buck converter that provides high efficiency power conversion in the conversion ratio range of 0% to 25% and can also provide high efficiency operation at heavy load conditions.

The present disclosure relates to a regulation scheme suitable for the buck converter 200. The regulation scheme may be implemented by a regulation loop circuit.

Figure 3:
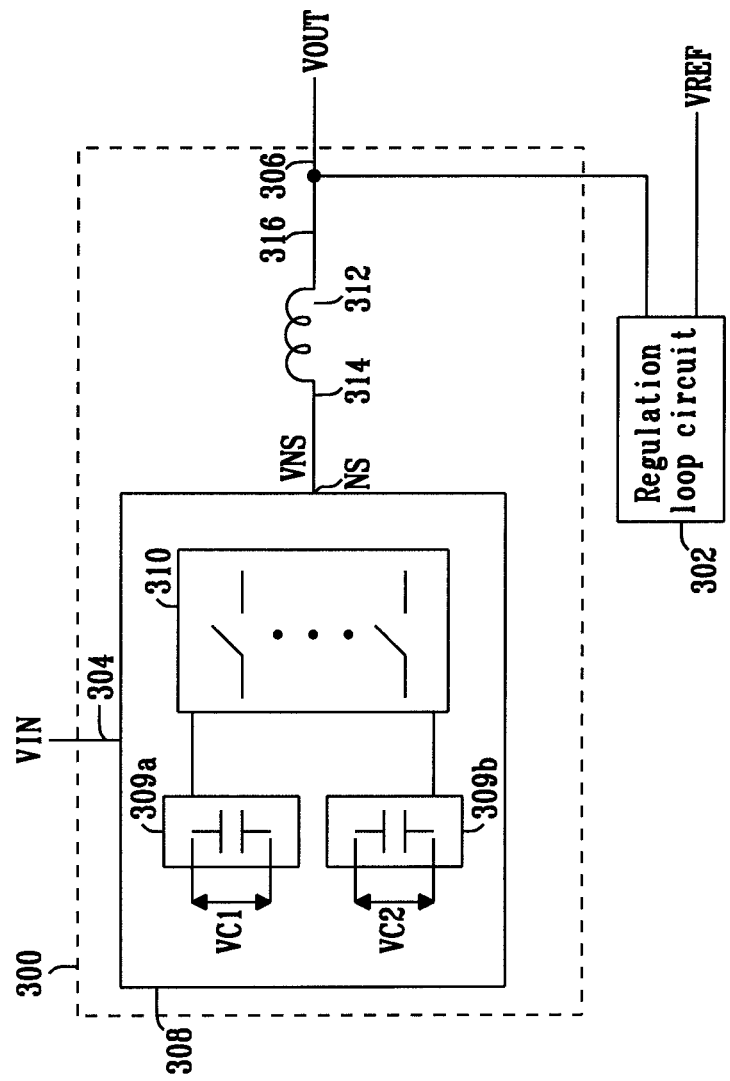
FIG. 3 is a schematic of a buck converter and regulation loop circuit in accordance with a first embodiment of the present disclosure.

FIG. 3 is a schematic of a buck converter 300 and regulation loop circuit 302 in accordance with a first embodiment of the present disclosure. The buck converter 300 is an example of a 2-stage converter. The buck converter 300 is configured to receive an input voltage VIN at an input terminal 304 and to provide an output voltage VOUT at an output terminal 306. The buck converter 300 comprises a capacitive divider 308 coupled to the input terminal 304 and comprising a capacitor 309a, a capacitor 309b, and a plurality of switches 310. The buck converter 300 further comprises an inductor 312 comprising a terminal 314 coupled to the capacitive divider 308 at a switching node NS, and a terminal 316 coupled to the output terminal 306.

The buck converter 300 may be referred to as "the power stage". It will be appreciated that in a specific embodiment, the input voltage VIN may be a battery voltage. The capacitors 309a, 309b are flying capacitors and may be referred to as "fly caps".

The regulation loop circuit 302 is configurable to be coupled to the output terminal 306 and a reference voltage VREF, and to regulate the output voltage VOUT based on the reference voltage VREF. The reference voltage VREF defines the desired output voltage VOUT and therefore in effect controls the conversion ratio as the input voltage VIN is fixed.

During operation, the regulation loop circuit 302 regulates the output voltage VOUT by regulating a switching node voltage VNS at the switching node NS by switching the buck converter 300 through a plurality of phases, comprising a first phase, a second phase and a third phase. The regulation loop circuit 302 switches the buck converter 300 through the plurality of phases by selectively operating the switches 310 to provide a capacitor voltage VC1 across the capacitor 308a and a capacitor voltage VC2 across the capacitor 308b. In the present embodiment the switching node voltage VNS in each phase is dependent on a switching state of one or more of the switches 308, the capacitor voltage VC1 and the capacitor voltage VC2. The regulation loop circuit 302 is further configured to maintain an approximately equal duration for each of the first phase, the second phase and the third phase with respect to each other irrespective of the reference voltage VREF. During the first phase, the second phase and the third phase the inductor 312 is magnetized. In the present embodiment, the inductor 312 is magnetized when the switching node voltage VNS is greater than the output voltage VOUT.

It will be appreciated that the term "approximately equal" is used to address the fact that there will be some minor variation between the phase durations resulting from the physical implementation of circuit, and its associated operational characteristics, as will be clear to the skilled person.

The plurality of phases may comprise a fourth phase. Preferably, the inductor 312 is demagnetized in the fourth phase. In the present embodiment, the inductor 312 is demagnetized when the switching node voltage VNS is less than the output voltage VOUT.

Preferably, the capacitor voltage VC2 across the capacitor 309b is approximately equal to half of the capacitor voltage VC1, across the capacitor 309a. Preferably the capacitor voltage VC1 is approximately equal to half of the input voltage VIN and the capacitor voltage VC2 is approximately equal to a quarter of the input voltage VIN. In the present embodiment, the regulation loop circuit 302 is configured to regulate the output voltage VOUT to be between approximately one quarter of the input voltage VIN and zero volts.

In the present embodiment, the regulation loop circuit 302 is configured to operate the buck converter 300 in a constant current mode (CCM). CCM operation helps reduce inductor ripple and associated core loss. It also helps reduce output voltage overshoot during a load release. In particular CCM can provide better load release recovery than DCM or PFM operation. Also, CCM operation can result in lower output voltage ripple.

In an alternative embodiment the buck converter 300 may operate in a constant conduction mode. In an alternative embodiment the buck converter 300 may operate in discontinuous conduction mode (DCM).

In operation, the output voltage VOUT may be regulated to a value that is between 0 volts and a quarter of the input voltage VIN.

The node NS may have a maximum voltage swing of a quarter of the input voltage VIN.

The regulation loop circuit 302 may provide pulse width modulation regulation to the buck converter 300.

In the hybrid SC power converter 100 the phases may be of equal duration but there is no reference voltage VREF and no regulation is provided. Therefore, the conversion ratio is limited to 25%. The buck converter 200 uses voltage regulation and can provide conversion ratios between 25% to 0%, but the phases are not of equal duration and therefore it is unsuitable for heavy load operation. In the present disclosure the inductor 312 is magnetized over three phases and these phases are of equal duration with respect to each other irrespective of the reference voltage VREF (and therefore the conversion ratio).

By ensuring that the first, second and third phases are of equal duration, charge balancing (Amp-sec balancing) of the capacitors 309a, 309b can be achieved which provides efficient operation of the buck converter 300. The durations of the first, second and third phases may vary, for example if the conversion ratio changes, as is required to regulate the load properly. However, the first, second and third phases will maintain an approximately equal duration with respect to each other, irrespective of any changes to the conversion ratio. In effect, the durations of the first, second and third phases will remain approximately equal to each other but may vary relative to the duration of the fourth phase if the reference voltage VREF, and therefore the conversion ratio changes.

Figure 4:
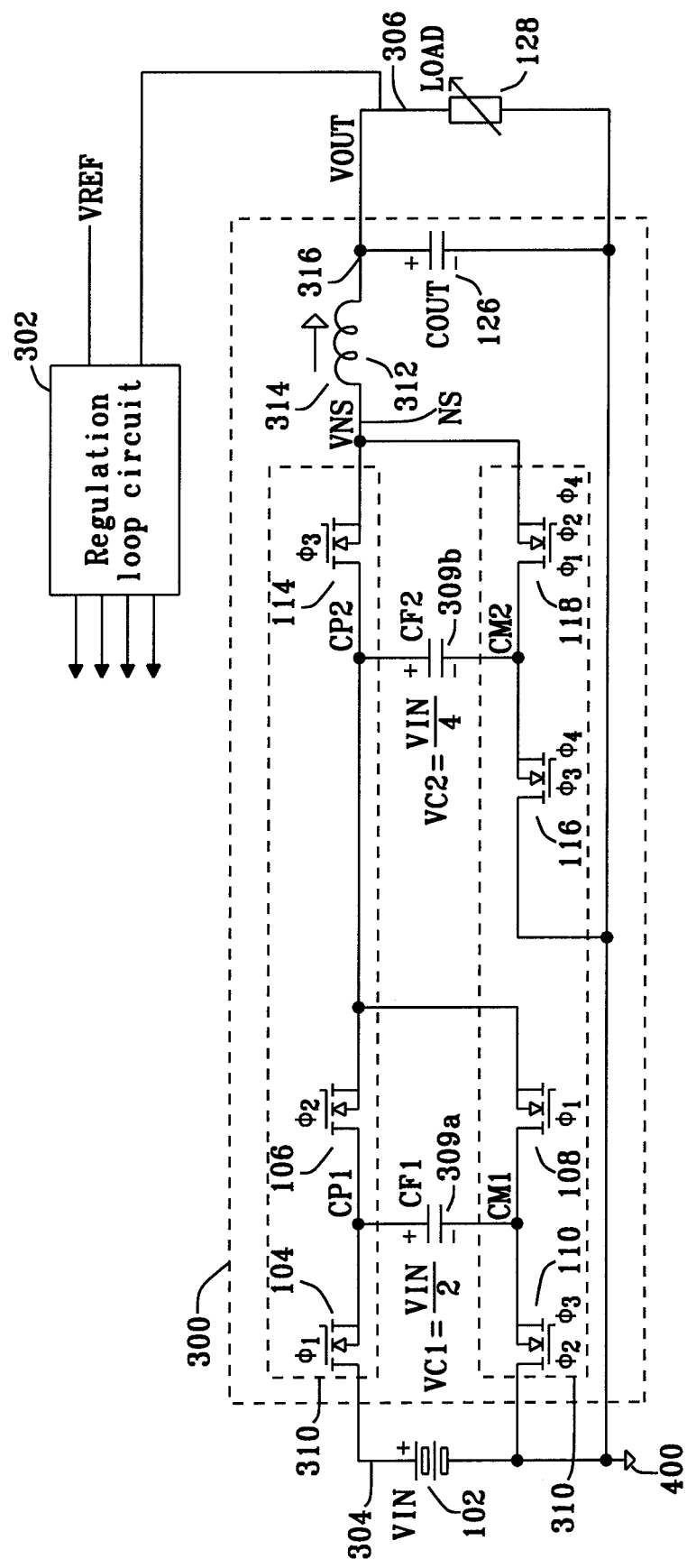
FIG. 4 is a schematic of a specific embodiment of the buck converter of FIG. 3 with the regulation loop circuit in accordance with a second embodiment of the present disclosure.

FIG. 4 is a schematic a specific embodiment of the buck converter 300 of FIG. 3 with the regulation loop circuit 302 in accordance with a second embodiment of the present disclosure. In the present embodiment, the buck converter 300 corresponds to the buck converter 200 of FIG. 2, with the regulation loop circuit 302 providing a different regulation loop from that described for FIG. 2. Common reference numerals and variables between Figures represents common features.

It will be clear to the skilled person that the capacitor 309a corresponds to the capacitor 120 of FIG. 1; the capacitor 309b corresponds to the capacitor 124 of FIG. 1 and the inductor 312 corresponds to the inductor 202 of FIG. 2.

In the present embodiment, the plurality of switches 310 comprises the switch 104, the switch 106, the switch 108, the switch 110, the switch 114, the switch 116 and the switch 118. Each of the switches 104-118 comprises a transistor, such as a metal oxide semiconductor field effect transistor (MOSFET), however it will be appreciated that in further embodiments the switches may be implemented in different ways in accordance with the understanding of the skilled person. The switches 104-118 may be referred to as power switches. When implemented using MOSFETs, the switches 104-118 may be referred to as power FETs.

A terminal CP1 of the capacitor 309a is coupled to the input terminal 304 via the switch 104 when the switch 104 is in a closed state. The terminal CP1 is coupled to a terminal CP2 of the capacitor 309b via the switch 106 when the switch 106 is in a closed state.

A terminal CM1 of the capacitor 309a is coupled to the terminal CP2 via the switch 108 when the switch 108 is in a closed state. The terminal CM1 is coupled to a voltage terminal 400 via the switch 110 when the switch 110 is in a closed state. In the present embodiment the voltage terminal 400 is a ground terminal which may be at zero volts.

The terminal CP2 is coupled to the switching node NS via the switch 114 when the switch 114 is in a closed state. A terminal CM2 of the capacitor 309b is coupled to the switching node NS via the switch 118 when the switch 118 is in a closed state. The terminal CM2 is coupled to the voltage terminal 400 via the switch 116 when the switch 116 is in a closed state.

In the present embodiment, the regulation loop circuit 302 is configured to provide a plurality of control signals $\Phi_1$, $\Phi_2$, $\Phi_3$, $\Phi_4$. Each control signal is provided to one of the plurality of switches 104-118 and each control signal is suitable for setting a state of a switch, thereby selectively operating the plurality of switches.

In the present embodiment, the regulation loop circuit 302 outputs four control signals $\Phi_1$, $\Phi_2$, $\Phi_3$, $\Phi_4$ that are used to drive the switching operation of the switches 104-118. The switches 104 and 108 each receive the control signal (N. The switch 106 receives the control signal $\Phi_2$. The switch 110 receives the control signals $\Phi_2$, $\Phi_3$. The switch 114 receives the control signal $\Phi_3$. The switch 116 receives the control signal $\Phi_3$, $\Phi_4$. The switch 118 receives the control signals $\Phi_1$, $\Phi_2$, $\Phi_4$. Each of the control signals $\Phi_1$, $\Phi_2$, $\Phi_3$, $\Phi_4$ are provided to the gates of the relevant switches 104-118.

It will be appreciated that the control signals $\Phi_1$, $\Phi_2$, $\Phi_3$, $\Phi_4$ may be provided by fewer or more control signals whilst still maintaining the required functionality, in accordance with the understanding of the skilled person.

Figure 5:
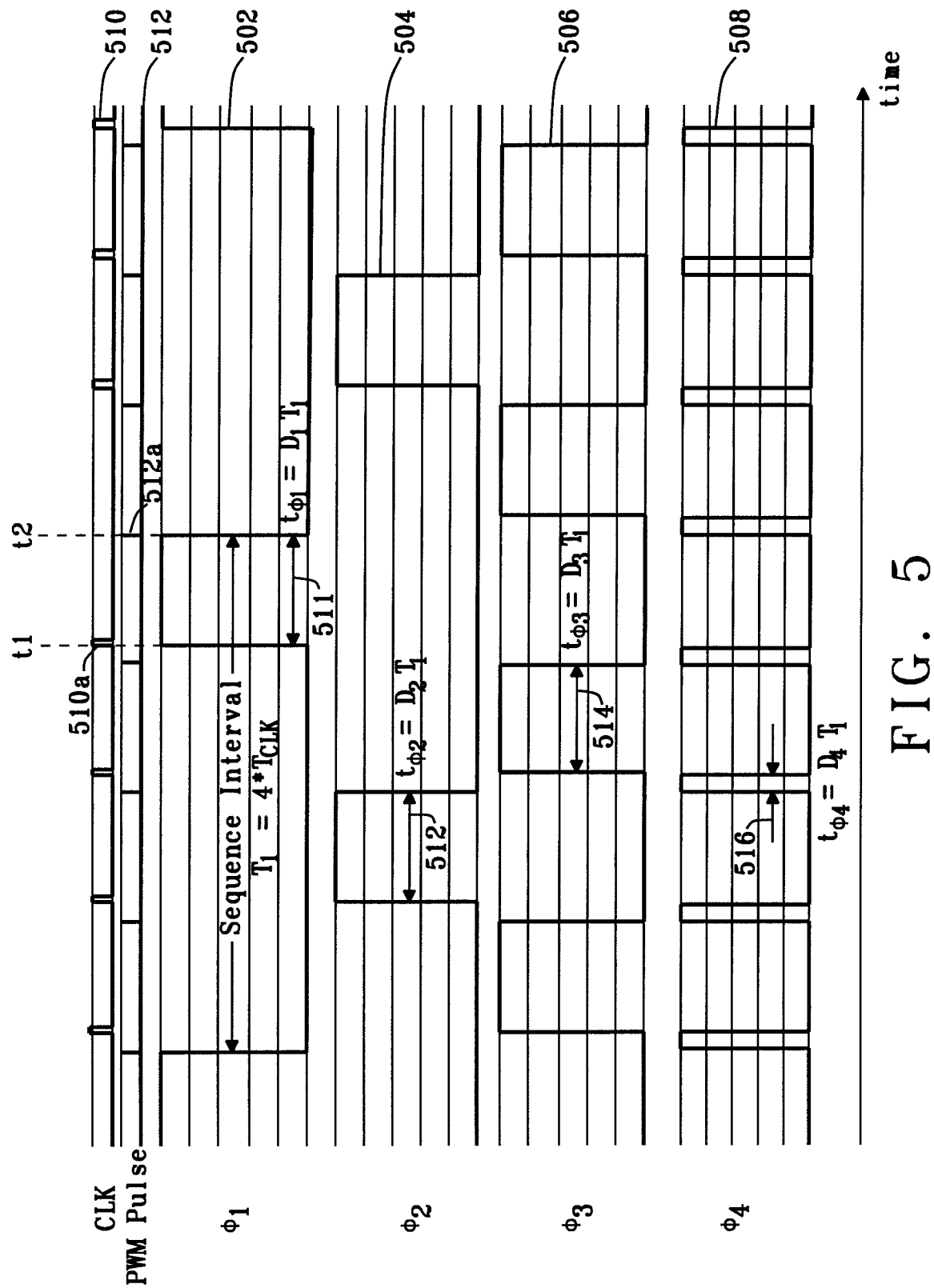
FIG. 5 is a timing diagram showing a switch control scheme as provided by the regulation loop circuit of FIG. 4.

FIG. 5 is a timing diagram showing a switch control scheme as provided by the regulation loop circuit 302 in the present embodiment. FIG. 5 shows the control signals $\Phi_1$-$\Phi_4$ that control the states of the switches 104-118 as shown in FIG. 4 in a manner that results in high efficiency. In the present embodiment, a switch is in the closed state (and therefore switched "on") when the control signal $\Phi_1$-$\Phi_4$ provided to its gate is in a high state. In the present embodiment the switch is in the open state (and therefore switched "off") when the control signal $\Phi_1$-$\Phi_4$ provided to its gate is in a low state. A switch permits current flow when it is in the closed state and prevents current flow when it is in the open state. It will be appreciated that other switch configurations responsive to different control signal configurations are possible, in accordance with the understanding of the skilled person.

A trace 502 shows a time varying operation of the control signal $\Phi_1$, a trace 504 shows a time varying operation of the control signal $\Phi_2$, a trace 506 shows a time varying operation of the control signal $\Phi_3$, and a trace 508 shows a time varying operation of the control signal $\Phi_4$.

The first phase occurs over a period of time over in which the control signal $\Phi_1$ is in the high state. A single occurrence of the first phase is denoted by numeral 511 in FIG. 5. The second phase occurs over a period of time over which the control signal $\Phi_2$ is in the high state. A single occurrence of the second phase is denoted by numeral 512 in FIG. 5. The third phase occurs over a period of time over which the control signal $\Phi_3$ is in the high state. A single occurrence of the third phase is denoted by numeral 514 in FIG. 5. The fourth phase occurs over a period of time over which the control signal $\Phi_4$ is in the high state. A single occurrence of the fourth phase is denoted by numeral 516 in FIG. 5.

The switching node voltage VNS is approximately equal to a quarter of the input voltage VIN during the first phase, the second phase and the third phase. The switching node voltage VNS is equal to 0V during the fourth phase.

Figure 6:
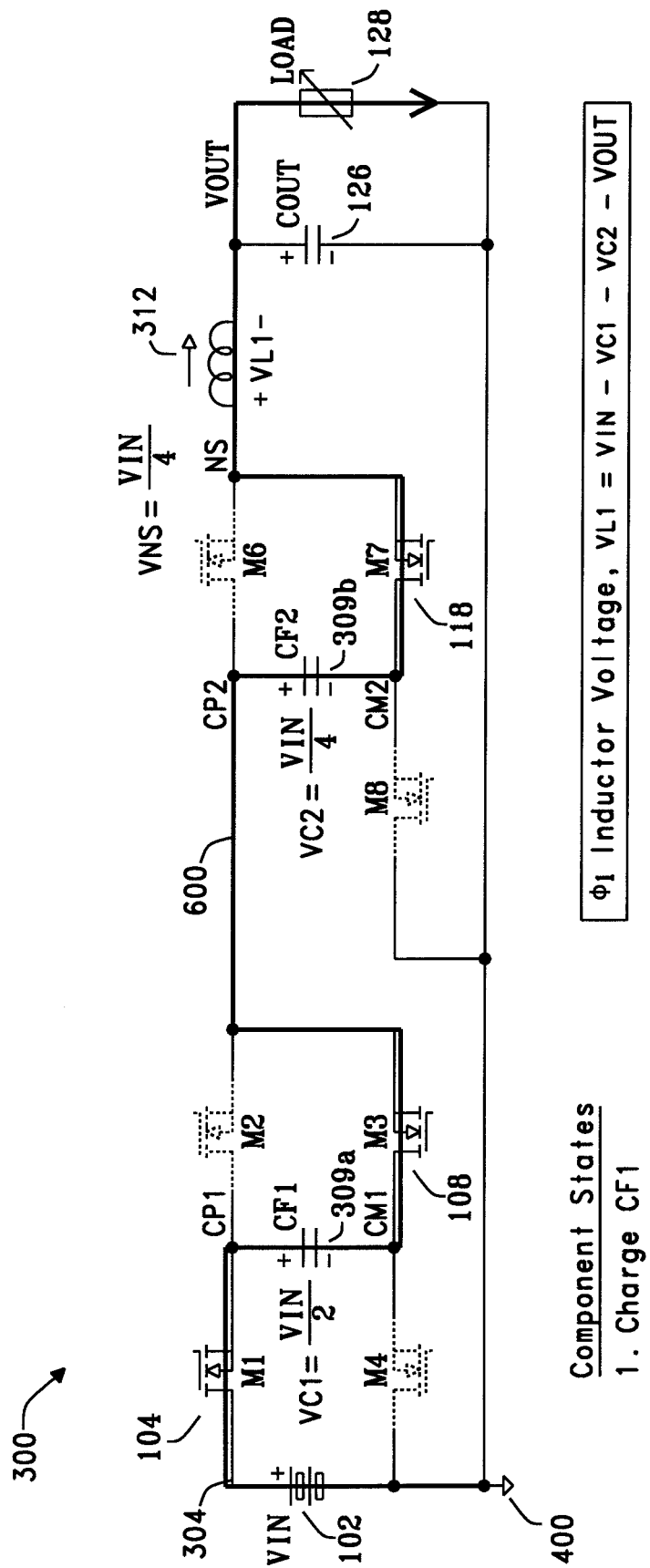
FIG. 6 is a schematic of the buck converter showing a path of current flow through the inductor during a first phase.

FIG. 6 is a schematic of the buck converter 300 showing a path of current flow through the inductor 312 during the first phase. The valley of the inductor current may be non-zero depending on the current drawn by the load.

During the first phase the terminal CP1 of the capacitor 309a is coupled to the input terminal 304, the terminal CM1 of the capacitor 309a is coupled to the terminal CP2 of the capacitor 309b, and the terminal CM2 of the capacitor 309b is coupled to the switching node NS.

During the first phase, the capacitors 309a, 309b are charged and the inductor 312 is magnetized. An inductor voltage VL1 during the first phase is as follows:

$$VL1=VIN-VC1-VC2-VOUT \qquad (2)$$

Figure 7:
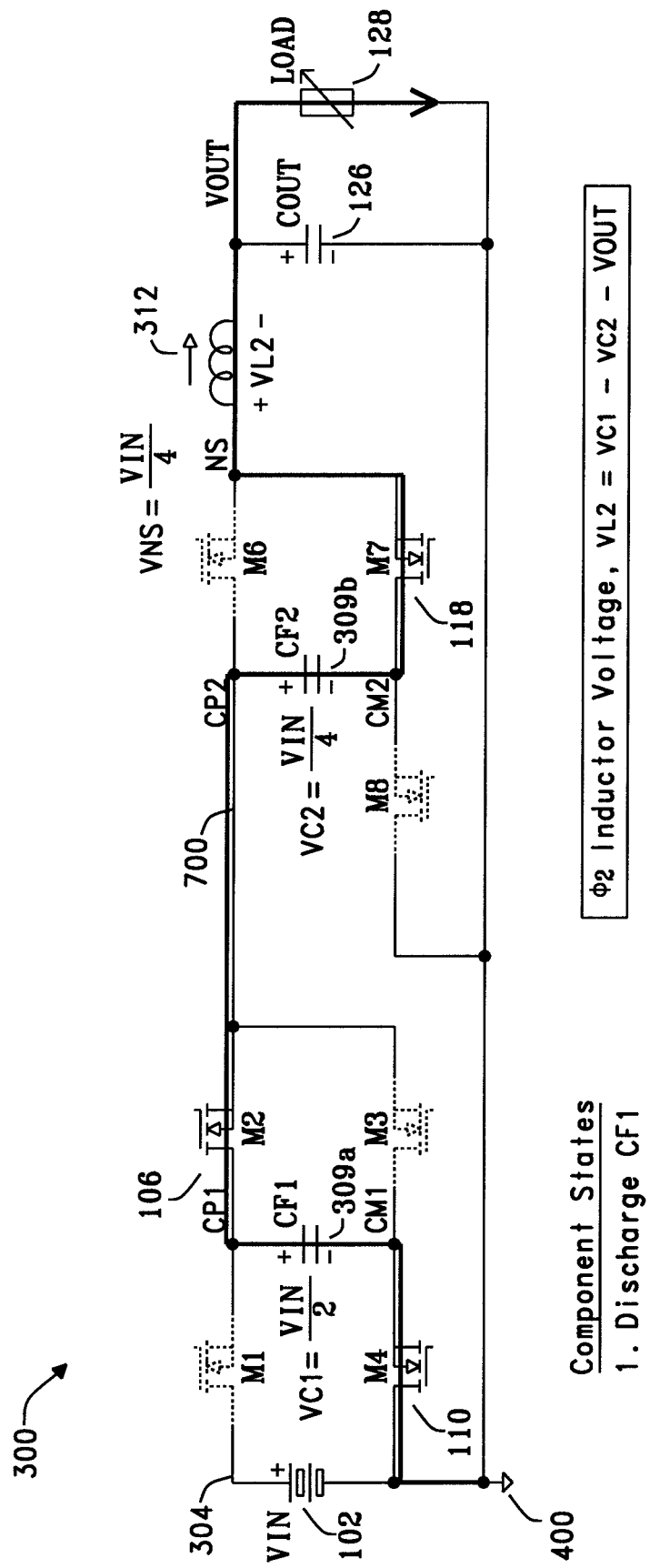
FIG. 7 is a schematic of the buck converter showing a path of current flow through the inductor during a second phase.

FIG. 7 is a schematic of the buck converter 300 showing a path of current flow through the inductor 312 during the second phase.

During the second phase, the terminal CP1 of the capacitor 309a is coupled to the terminal CP2 of the capacitor 309b, the terminal CM1 of the capacitor 309a is coupled to the voltage terminal 400, and the terminal CM2 of the capacitor 309b is coupled to the switching node NS.

During the second phase, the capacitor 309a is discharged, the capacitor 309b is charged and the inductor 312 is magnetized. An inductor voltage VL2 during the second phase is as follows:

$$VL2=VC1-VC2-VOUT \qquad (3)$$

Figure 8:
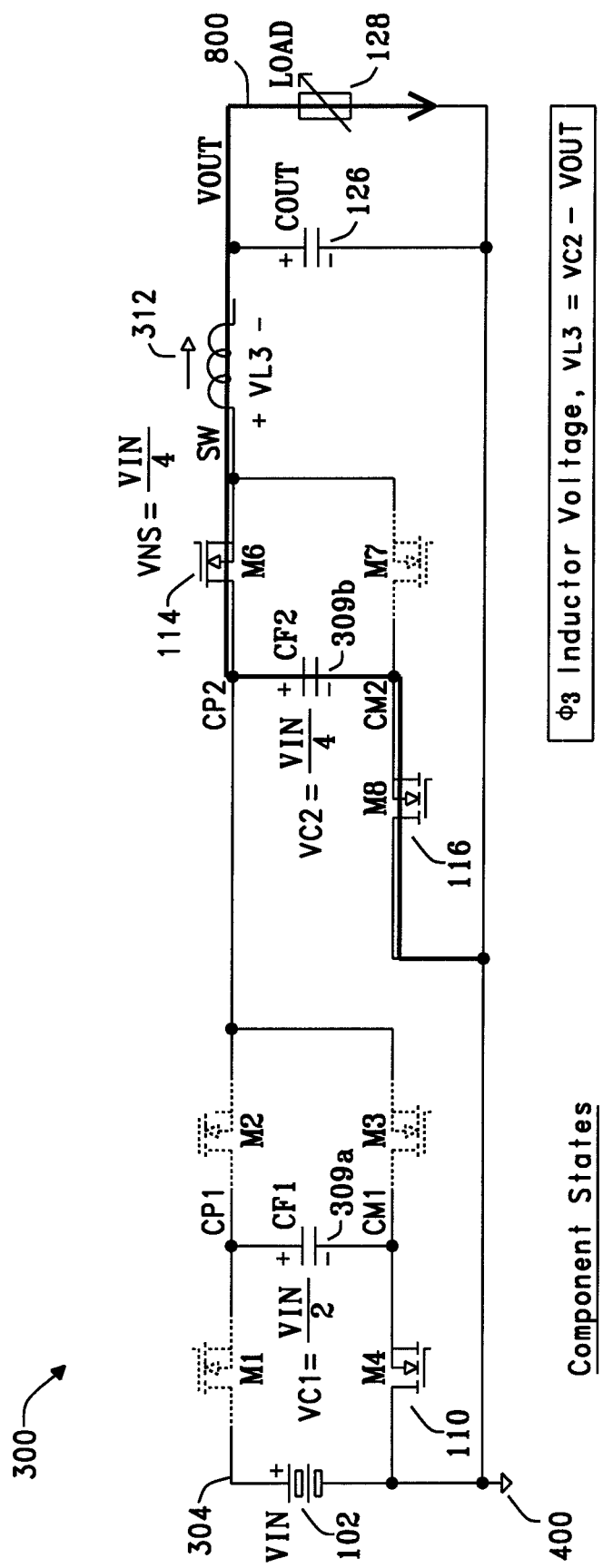
FIG. 8 is a schematic of the buck converter showing a path of current flow through the inductor during a third phase.

FIG. 8 is a schematic of the buck converter 300 showing a path of current flow through the inductor 312 during the third phase.

During the third phase, the terminal CP1 of the capacitor 309a is floating, the terminal CM1 of the capacitor 309a is coupled to the voltage terminal 400, the terminal CP2 of the capacitor 309b is coupled to the switching node NS and the terminal CM2 of the capacitor 309b is coupled to the voltage terminal 400.

During the third phase, the capacitor 309a is floating, the capacitor 309b is discharged and the inductor 312 is magnetized. An inductor voltage VL3 during the third phase is as follows:

$$VL3=VC2-VOUT \qquad (4)$$

Figure 9:
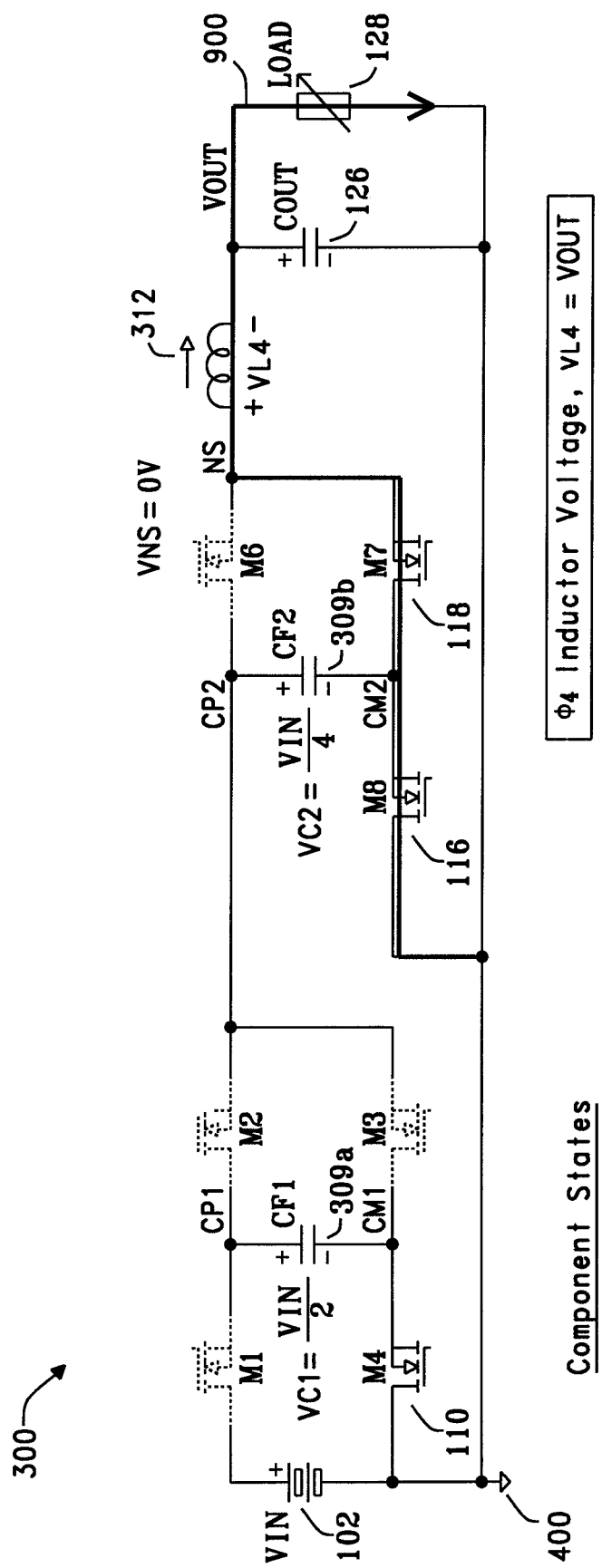
FIG. 9 is a schematic of the buck converter showing a path of current flow through the inductor during a fourth phase.

FIG. 9 is a schematic of the buck converter 300 showing a path of current flow through the inductor 312 during the fourth phase.

During the fourth phase, the terminal CP1 of the capacitor 309a is floating, the terminal CP2 of the capacitor 309b is floating, and the terminals CM1, CM2 are coupled to the voltage terminal 400. Additionally, the switching node NS is coupled to the voltage terminal 400.

During the fourth phase, the capacitor 309a is floating, the capacitor 309b is floating and the inductor 312 is demagnetized. An inductor voltage VL4 during the fourth phase is as follows:

$$VL4=VOUT \qquad (4)$$

A path of inductor current flow 600, 700, 800, 900 is shown for each of the four phases on FIGS. 6, 7, 8 and 9. Also listed are the conditions of the reactive elements, CF1 (the capacitor 309a), CF2 (the capacitor 309b) and the inductor 312. Charge is added to, removed from or held on the capacitors 309a, 309b during a particular phase as indicated, and as described previously. Also, the inductor 312 is either magnetized or de-magnetized in every phase.

To achieve steady-state operation, charge balance needs to be maintained for each of the capacitors 309a, 309b (i.e., Amp-sec balance), and the inductor's 312 magnetic field should have no net change (i.e., Volt-sec balance) over a complete sequence interval of four clock (CLK) pulses. A trace 510 showing the CLK pulses is shown in FIG. 5. A "pulse" occurs when a signal transitions from a first state to a second state before transitioning back to the first state after a short period of time. The definition of a "short" time period will be dependent on the application as will be clear to the skilled person. In the present example, the CLK pulses when it transitions from the low state to the high state to the low state.

Since the capacitor 309b is charged during the first phase and the second phase it is desirable that there are two third phase periods for each sequence comprising four CLK pulses as shown in FIG. 5. This can be used to provide appropriate charge balancing for the capacitor 309b.

To maximise efficiency with the buck converter 300, it is preferable that the control scheme provided by the regulation loop circuit 302 maintains the capacitor voltage VC1 as being approximately equal to half of the input voltage VIN and maintains the voltage VC2 as being approximately equal to a quarter of the input voltage VIN. To provide the capacitor voltages VC1, VC2 at these levels, in the present example, the durations of the first phase, the second phase and the third phase are of approximately equal duration as shown by the durations represented for each of these phases by numerals 511, 512, 514 in FIG. 5.

Combining this criterion with the expressions for the inductor voltage VL1, VL2, VL3, VL4, the requirements for inductor 312 Volt-sec balance can be calculated. If the three phases are of equal duration then the capacitor voltage VC1 is equal to half of the input voltage VIN and the capacitor voltage VC2 is equal to a quarter of the input voltage VIN, and the proposed control scheme provided by the regulation loop circuit 302 accomplishes steady-state operation with optimal efficiency.

In the present embodiment, and with reference to FIG. 5, the regulation loop circuit 302 is configured to switch between the four phases in a sequence as follows: the first phase, the fourth phase, the third phase, the fourth phase, the second phase, the fourth phase, the third phase and the fourth phase. The sequence is then repeated.

The relation between the duty cycles D1, D2, D3 and D4 for each of the first, the second, the third and the fourth phases, respectively, may be described as follows:

$$D1+D2+2\cdot D3+4D4=1 \quad (5)$$

where D1=D2=D3.

The duration of each of the four phases varies as the conversion ratio varies. The duration of the fourth phase is equal to zero for a conversion ratio of 25%.

Figure 10:
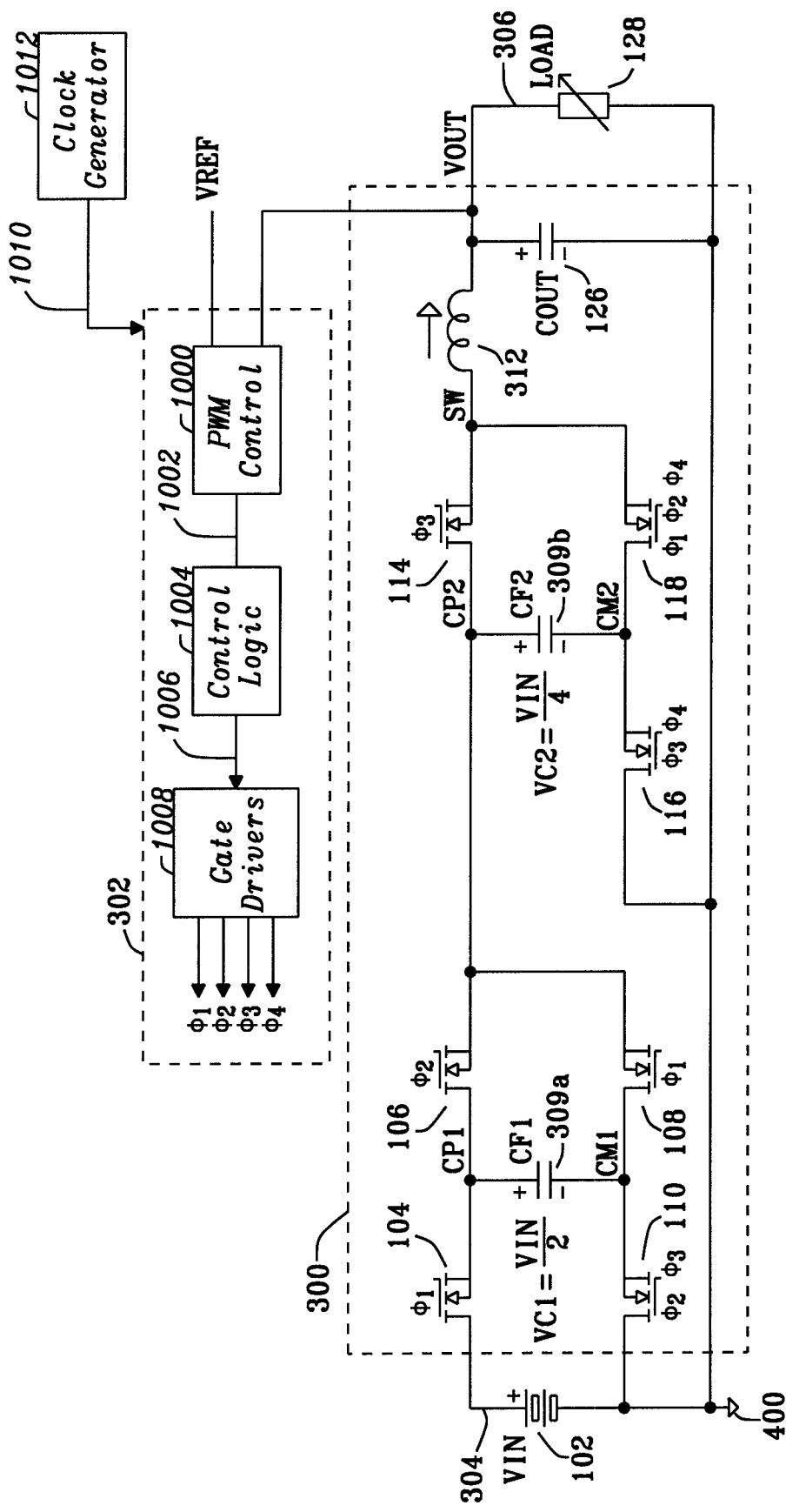
FIG. 10 is a schematic of the buck converter and a specific embodiment of the regulation loop circuit in accordance with a third embodiment of the present disclosure.

FIG. 10 is a schematic of the buck converter 300 as previously described, and a specific embodiment of the regulation loop circuit 302 in accordance with a third embodiment of the present disclosure.

The regulation loop circuit 302 comprises a pulse width modulation circuit 1000 configured to receive the output voltage VOUT and the reference voltage VREF and to generate a pulse width modulation signal 1002 at an output of the pulse width modulation circuit 1000. The pulse width modulation circuit 1000 may be referred to as a PWM control stage.

The regulation loop circuit 302 further comprises control logic 1004 configured to receive the pulse width modulation signal 1002 and to generate a logic output signal 1006. The plurality of control signals $\Phi_1$, $\Phi_2$, $\Phi_3$, $\Phi_4$ is dependent on the logic output signal 1006.

In the present embodiment, the regulation loop circuit 302 further comprises gate driver circuitry 1008 that is configured to receive the logic output signal 1006 from an output of the control logic 1004 and to provide the plurality of control signals $\Phi_1$, $\Phi_2$, $\Phi_3$, $\Phi_4$. Each of the control signals $\Phi_1$, $\Phi_2$, $\Phi_3$, $\Phi_4$ is provided to one of the switches 104-118, as discussed previously. In operation the control signal received by a switch is used to control the switching state of that switch. The gate driver circuitry 1008 functions to convert the logic output signal 1006 into the four separate control signals $\Phi_1$, $\Phi_2$, $\Phi_3$, $\Phi_4$ necessary to drive the switching of the switches 104-118. The gate driver circuitry 1008 acts to ensure that the control signals $\Phi_1$, $\Phi_2$, $\Phi_3$, $\Phi_4$ have suitable properties (such as the required voltage and/or current characteristics) to switch the switches 104-118 in the manner that is required to provide the switching functionality as previously described. It will be appreciated that the control signals $\Phi_1$, $\Phi_2$, $\Phi_3$, $\Phi_4$ may be referred to as "gate driving signals".

The regulation loop circuit 302 is configured to receive a clock signal 1010. With reference to FIG. 5, the clock signal 1010 is represented by the trace 510. During operation, the first phase, the second phase and the third phase are initiated by the clock signal 1010, and each of the first, second and third phases are terminated by the pulse width modulation signal 1002 which is represented by a trace 512 in FIG. 5. The fourth phase differs from the first, second and third phases, and is initiated by the pulse width modulation signal 1002 (the trace 512) and terminated by the clock signal 1010 (the trace 510). The inclusion of phase four enables regulation of the output voltage VOUT.

For example, the first phase is triggered at a time t1 by a pulse 510a of the clock signal 1010 (shown on trace 510). The first phase continues for the period of time as shown by numeral 511, which is terminated by a pulse 512a of the pulse width modulation signal 1002 at a time t2. This process is repeated for the different phases using the sequence as previously described.

The clock signal 1010 may be provided by a clock generator 1012.

The regulation loop circuit 302 of the present disclosure enables "natural" fly cap balancing of the capacitors 309a, 309b. Specifically. the regulation loop circuit 302 eliminates the need for active or passive fly cap balance control if reasonable measures are taken to ensure that the propagation delays from the control logic 1004 to the gate driver circuitry 1008 are comparable to each other (e.g., <50% relative difference). It is unnecessary to "oversize" the input capacitance as is often the case with flying capacitor hybrid regulators as the fly cap charge balance for the proposed topology and control scheme is relatively unaffected by very low values of input capacitance. Furthermore it is unnecessary for all power switches to have the same ON-resistance in order to maintain proper fly cap charge balance. Also, the PCB routing impedances do not need to match for the charging and discharging paths of the two flying capacitors 309a, 309b.

The regulation loop circuit 302 of the present disclosure can provide active closed loop regulation of the buck converter's 300 output which helps to reduce the effect of disturbances on the system. Such disturbances may include load regulation, line regulation and output impedance.

Figure 11:
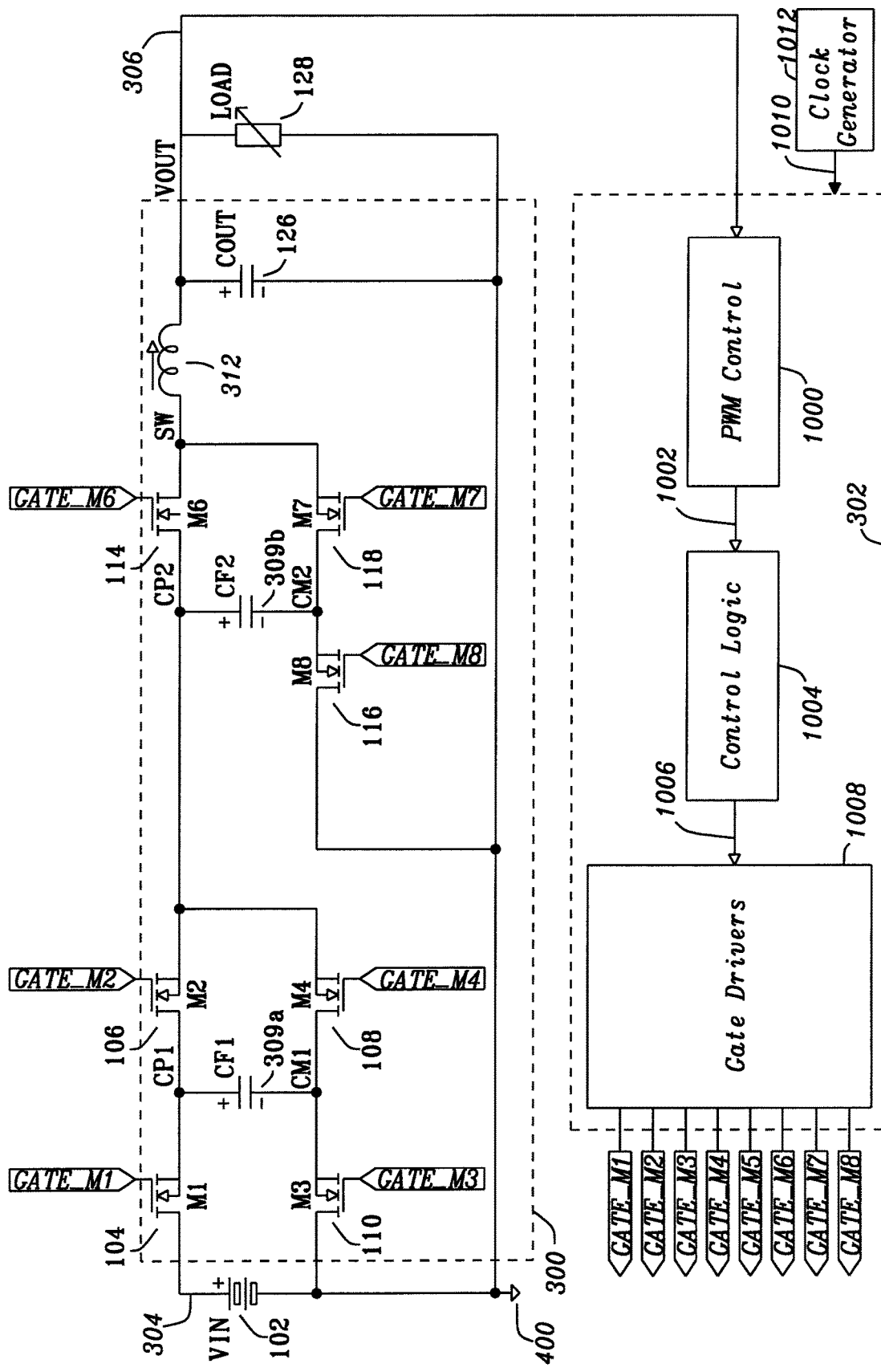
FIG. 11 is a schematic of the buck converter and the regulation loop circuit in accordance with a fourth embodiment of the present disclosure.

FIG. 11 is a schematic of the buck converter 300 and the regulation loop circuit 302 in accordance with a fourth embodiment of the present disclosure. The buck converter 300 and loop regulation circuit 302 of FIG. 11 is the same as that shown in FIG. 10, however, in FIG. 11, there are seven control signals such that there is a unique gate driving signal for each of the switches 104-118 in the present embodiment. Common features between Figures are represented by common reference numerals and variables.

The control signals in the present embodiment are labelled as follows: GATE_M1, GATE_M2, GATE_M3, GATE_M4, GATE_M6, GATE_M7, GATE_M8. The control signals GATE_M1, GATE_M2, GATE_M3, GATE_M4, GATE_M6, GATE_M7 and GATE_M8 are provided to the switches 104, 106, 108, 110, 114, 116 and 118, respectively.

The switches 104-118 are controlled as described previously and therefore a single control signal in the present embodiment may combine two or more of the control signals $\Phi_1$, $\Phi_2$, $\Phi_3$, $\Phi_4$ as previously described. For example, as described previously, the switch 118 receives the control signals $\Phi_1$, $\Phi_2$, $\Phi_4$ to control its switching operation. In the present embodiment the control signal GATE_M8 provided to the switch 118 is a single control signal that is in a high state during operation of the circuits 300, 302 when one or more of the control signals $\Phi_1$, $\Phi_2$, $\Phi_4$ as previously described is high and is in a low state when all of the control signals $\Phi_1$, $\Phi_2$, $\Phi_4$ are in a low state.

Figure 12:
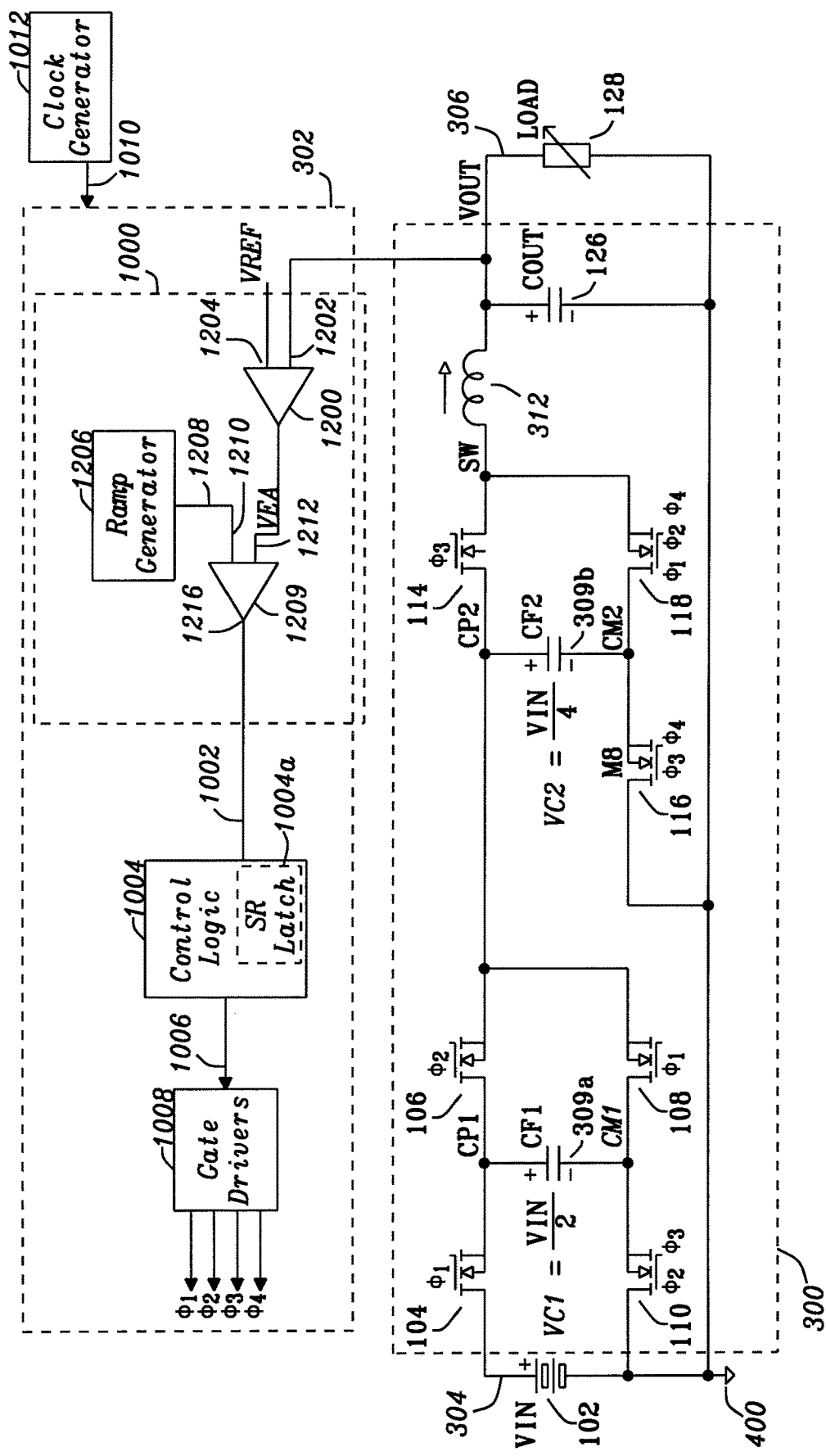
FIG. 12 is a schematic of the buck converter and the regulation loop circuit in accordance with a fifth embodiment of the present disclosure.

FIG. 12 is a schematic of the buck converter 300 and the regulation loop circuit 302 in accordance with a fifth embodiment of the present disclosure. The circuits 300, 302 of FIG. 12 correspond to the circuits 300, 302 of FIG. 10, however in the present embodiment a specific implementation of the pulse width modulation circuit 1000 is shown. Common features share common reference numerals and variables.

In the present embodiment the pulse width modulation circuit 1000 comprises an error amplifier 1200 with an input 1202 coupled to the output voltage terminal 306 and an input 1204 coupled to the reference voltage VREF.

The pulse width modulation circuit 1000 further comprises a ramp generator 1206 that is configured to generate a ramp signal 1208 that is provided at its output. A ramp generator is a type of circuit that will be known to the skilled person and generally may be described as a circuit that generates a periodic time-varying ramp signal. The ramp signal typically varies linearly with time thereby generating a sawtooth profile. It will be appreciated that the ramp signal 1208 may have other characteristics and provide the required functionality for the pulse width modulation circuit 1000 in accordance with the understanding of the skilled person.

The pulse width modulation circuit 1000 further comprises a comparator 1209 having an input 1210 coupled to the ramp generator 1206 and an input 1212 coupled to an output of the error amplifier 1200. In operation, the control logic 1004 receives the pulse width modulation signal 1002 from an output 1216 of the comparator 1209. The error amplifier 1200 outputs an error amplifier output signal VEA. In the present embodiment the input 1210 is a non-inverting input and the input 1212 is an inverting input.

In the present embodiment the pulse width modulation circuit 1000 is implemented using the error amplifier 1200, the comparator 1209 and the ramp generator 1206 to provide the required pulse width modulation signal 1002 that is needed to control the duration of the four phases. This provides a seamless pulse width modulation control scheme that produces the same duration for all switch states (the first phase, the second phase and the third phase) that cause the inductor 312 to be magnetized.

The control logic 1004 may comprise an S/R latch 1004a. During operating the clock signal 1010 may be applied to a set input of the S/R latch 1004a and the pulse width modulation signal 1002 as provided by the comparator 1209 could drive a reset input of the S/R latch 1004a. As shown in FIG. 12, the comparator 1209 receives the ramp signal 1208 at the input 1210 and the error amplifier output signal VEA at the input 1212.

Figure 13:
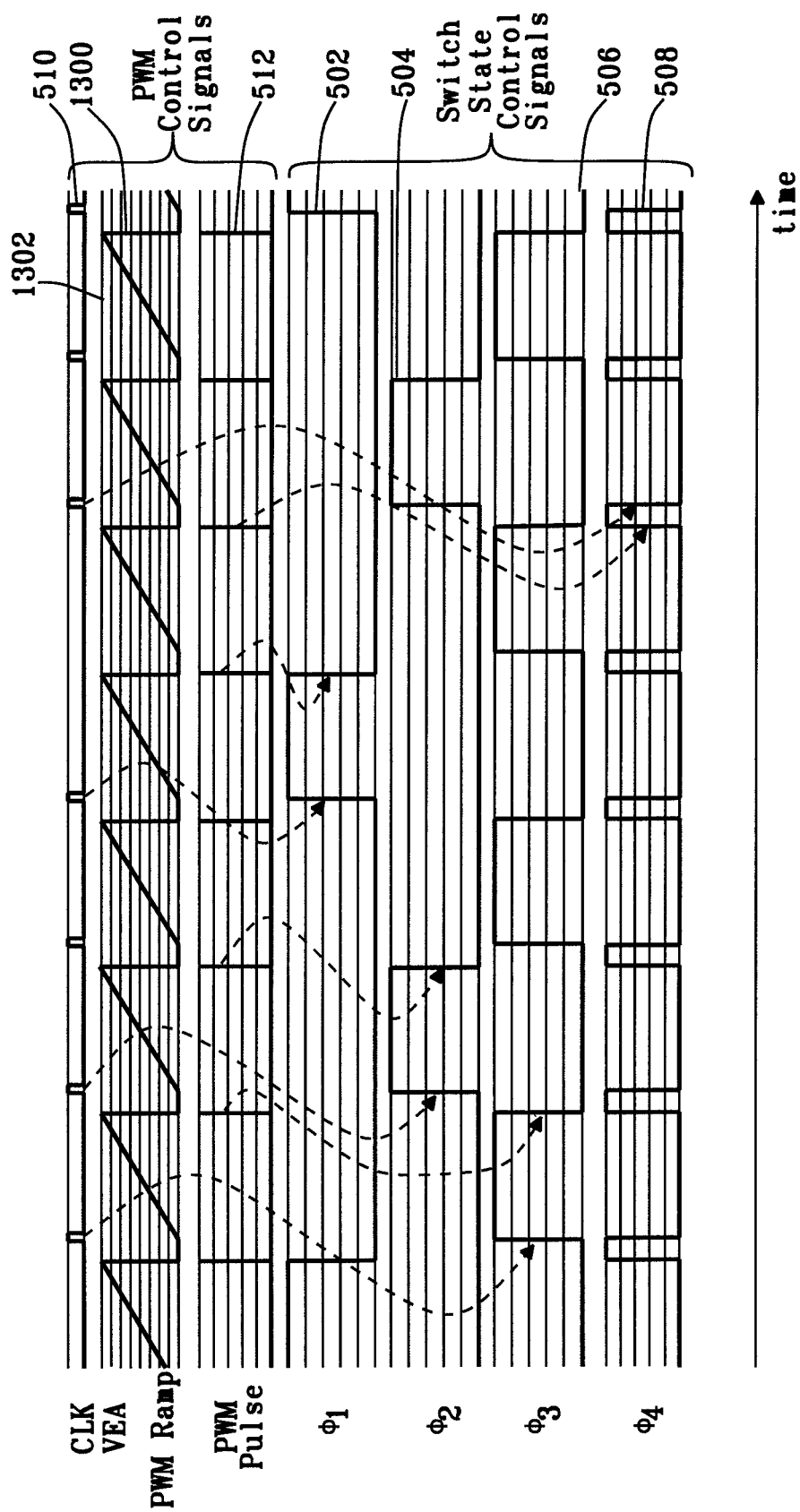
FIG. 13 is a timing diagram showing a switch control scheme as provided by the regulation loop circuit of the embodiment shown in FIG. 12.

FIG. 13 is a timing diagram showing a switch control scheme as provided by the regulation loop circuit 302 in the embodiment shown in FIG. 12. The functionality outlined by the timing diagram is the same as described for FIG. 5, but with the inclusion of a trace 1300 which represents the ramp signal 1208, and a trace 1302 which represents the error amplifier output signal VEA.

In operation, the ramp signal 1208 is reset when the pulse width modulation signal 1002 (the trace 512) by switching to a high state and the ramp signal is triggered and begins to increase when the clock signal 1010 (the trace 510) switches to a high state.

The clock signal 1010 (trace 510), the error amplifier output signal VEA (trace 1300), the ramp signal 1208 (trace 1300) and the pulse width modulation signal 1002 (trace 512) may collectively be referred to as the PWM control signals as these are used to generate the control signals $\Phi_1$, $\Phi_2$, $\Phi_3$, $\Phi_4$.

In the present embodiment, as the duration of the first phase, the second phase and the third phase are based on the same ramp signal 1208 and the comparator 1209, the duration of time over which each of these three periods occur can be approximately equal.

Figure 14:
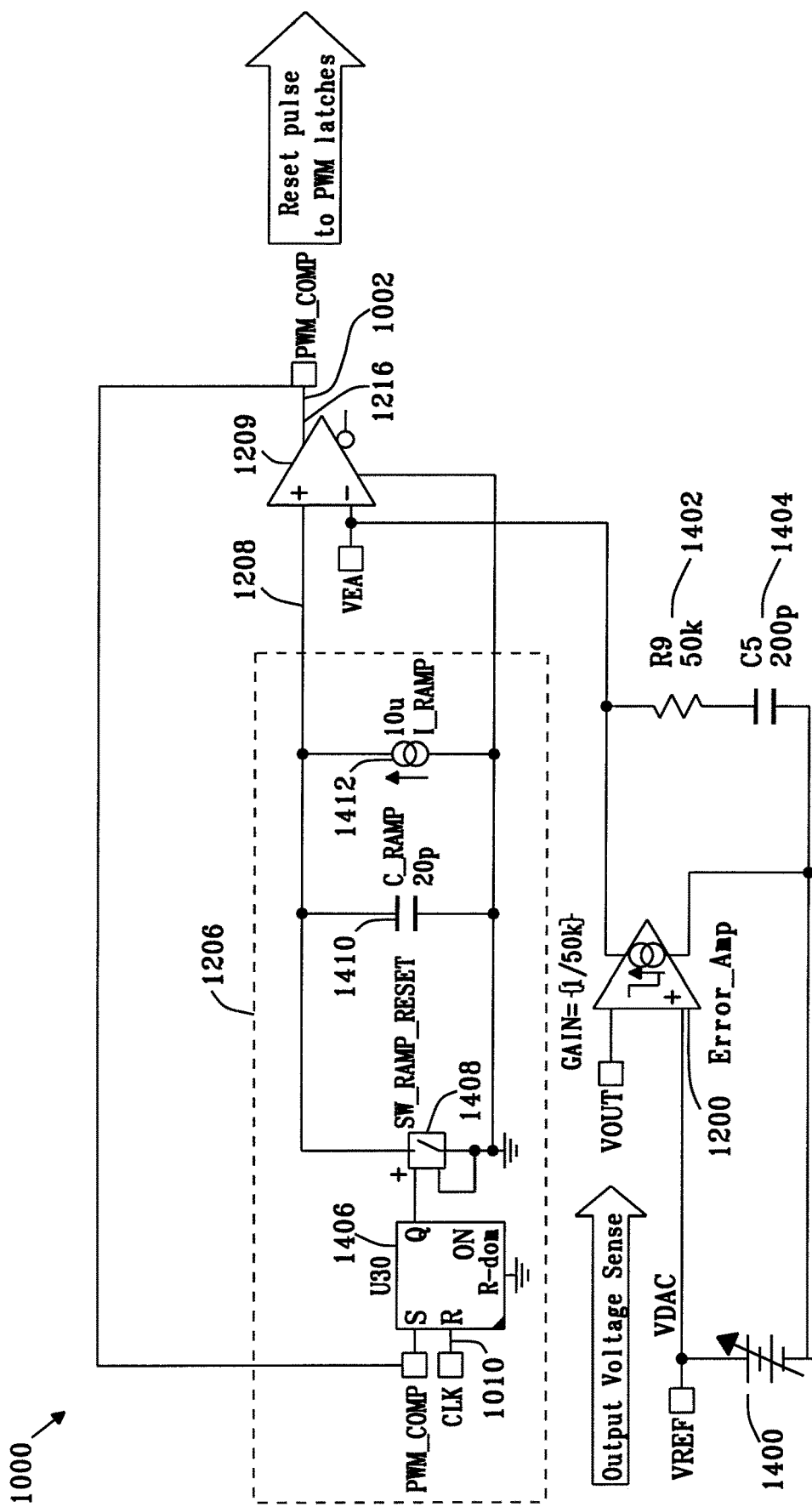
FIG. 14 is a schematic of a specific embodiment of the pulse width modulation circuit showing a specific implementation of the ramp generator.

FIG. 14 is a schematic of a specific embodiment of the pulse width modulation circuit 1000 showing a specific implementation of the ramp generator 1206. Common features between Figures share common reference numerals and variables.

In the present embodiment, the reference voltage VREF is provided by a variable power supply 1400, which may comprise a digital to analog converter (DAC). A resistor 1402 and capacitor 1404 are coupled in series between the output of the error amplifier 1200 and ground.

The ramp generator 1206 comprises a latch circuit 1406 comprising a set input S coupled to the output 1216 of the comparator 1209 and a reset input R coupled the clock generator 1012 (not shown) for receiving the clock signal 1010. The ramp generator 1206 comprises a switch 1408, a capacitor 1410 and a current source 1412. The output Q of the latch circuit 1406 controls the switching operation of the switch 1408. In operation, the latch circuit 1406 provides an output Q that resets the ramp signal 1208 when the pulse width modulation signal 1002 switches to the high state and triggers the ramp signal 1208 when the clock signal 1010 switches to the high state.

FIG. 14 provides voltage mode control. It will be appreciated that in further embodiments, other methods may be used as will be clear to the skilled person.

Figure 15:
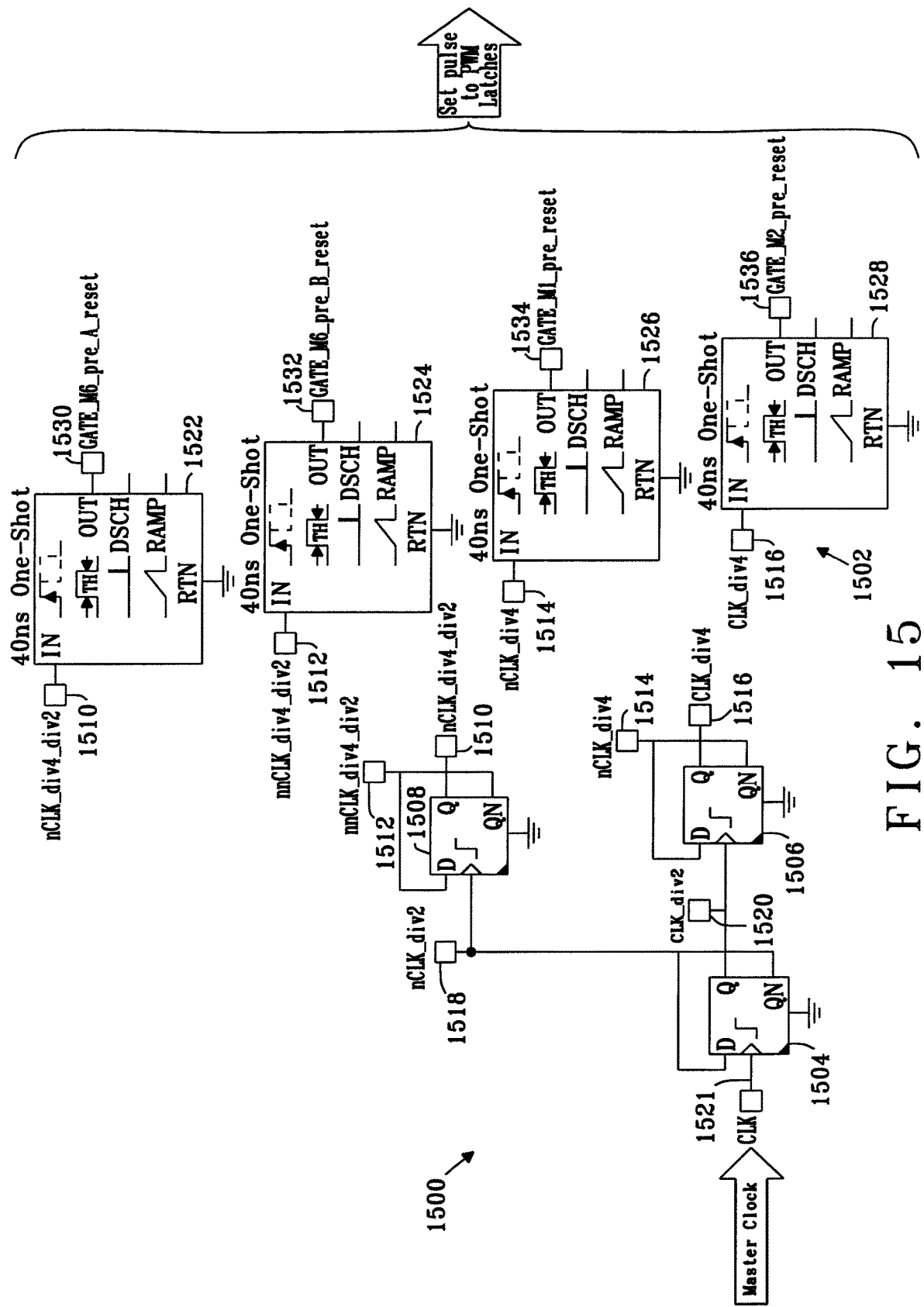
FIG. 15 is a schematic of a clock divider and a PWM latch reset control.

FIG. 15 is a schematic of a clock divider 1500 and a PWM latch reset control 1502. The clock divider 1500 and the PWM latch reset control 1502 may be part of the clock generator 1012 as described previously.

The clock divider 1500 comprises latch circuits 1504, 1506, 1508 and provides divided clock signals 1510, 1512, 1514, 1516, 1518, 1520. The clock divider 1500 receives a master clock signal 1521 which is used to generate the divided clock signals 1510, 1512, 1514, 1516, 1518, 1520.

The PWM latch reset control 1502 comprises one-shot circuits 1522, 1524, 1526, 1528. Each of the one-shot circuits 1522, 1524, 1526, 1528 receives one of the divided clock signals 1510, 1512, 1514, 1516. Each of the one-shot circuits 1522, 1524, 1526, 1528 generates a set pulse signal. The one-shot circuit 1522 generates a set pulse signal 1530, the one-shot circuit 1524 generates a set pulse signal 1532, the one-shot circuit 1526 generates a set pulse signal 1534 and the one-shot circuit 1528 generates a set pulse signal 1536.

The master clock signal 1521 may be the clock signal 1010 as previously described. Alternatively, the master clock signal 1521 may be any one of the divided clock signals 1510, 1512, 1514, 1516 or alternatively may correspond to more than one of the divided clock signals 1510, 1512, 1514, 1516, in accordance with the understanding of the skilled person.

Figure 16:
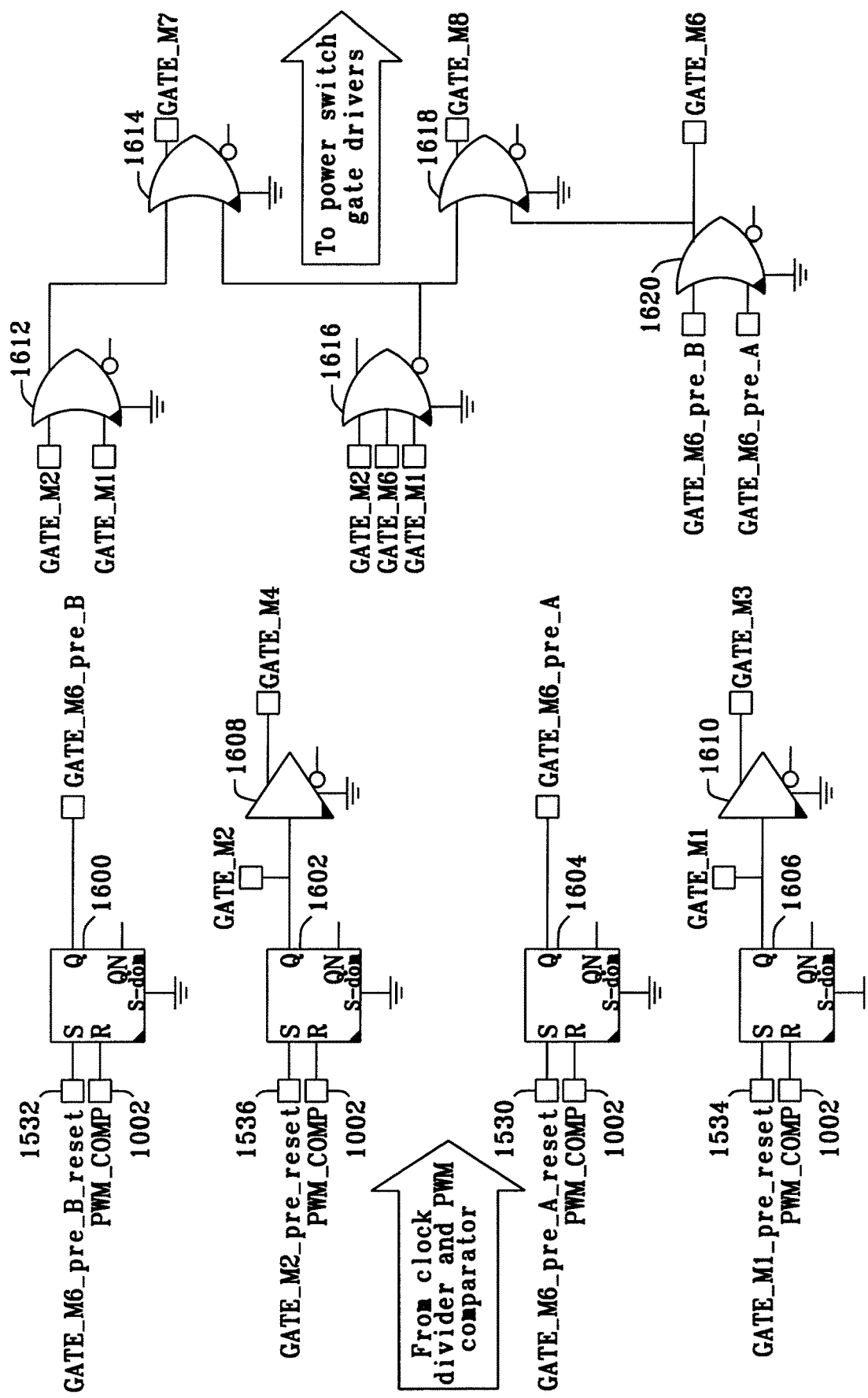
FIG. 16 is a schematic of PWM latches and combinational logic.

FIG. 16 is a schematic of PWM latches 1600, 1602, 1604, 1606 and combinational logic which may be provided as a part 1608 of the control logic 1004. The part 1608 of the control logic 1004 comprises comparator 1608, 1610 and logic gates 1612, 1614, 1616, 1618, 1620 and provides the control signals GATE_M1, GATE_M2, GATE_M3, GATE_M4, GATE_M6, GATE_M7, GATE_M8 which may be provided to the gate driver circuitry 1008.

Figure 17:
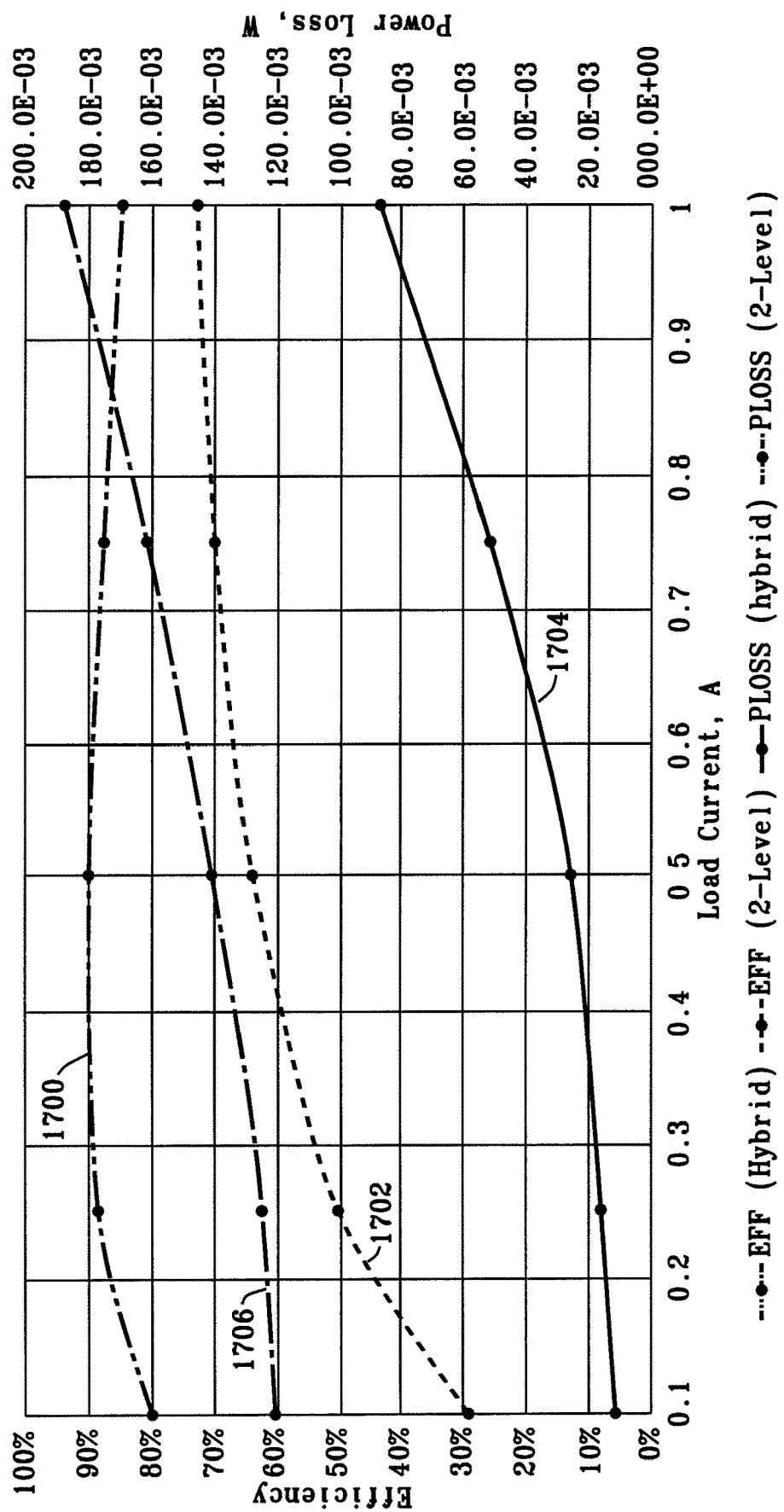
FIG. 17 is a graph showing simulation results for a 2-level buck converter of the prior art and the buck converter of the present disclosure using the regulation loop circuit.

FIG. 17 is a graph showing simulation results for a 2-level buck converter of the prior art and the buck converter 300 of the present disclosure and using the regulation loop circuit 302. Shown in FIG. 17 is the efficiency 1700 of the buck converter 300, the efficiency 1702 of the 2-level buck converter, the power loss 1704 of the buck converter 300 and the power loss 1706 of the 2-level buck converter as they vary with load current.

The simulation parameters were set to represent of a practical implementation of the circuits. An on resistance Rdson for all the power switches within the 2-level buck converter and the buck converter 300 were set as 20 mOhm. The input voltage VIN was 4V, the output voltage Vout was 0.5V, the inductance of the inductor (312 in the buck converter 300) was 470 nH and the capacitance of the capacitors (309a, 309b in the buck converter 300) was 20 mF. The switching frequency FSW was 1 MHz, The simulations included the DC and AC losses for the inductor. IQ related loss was not included.

It can be seen that the buck converter 300 of the present disclosure exhibits greater efficiency and smaller power loss over all load currents that were simulated, when compared with the 2-level buck converter of the prior art.

Figure 18:
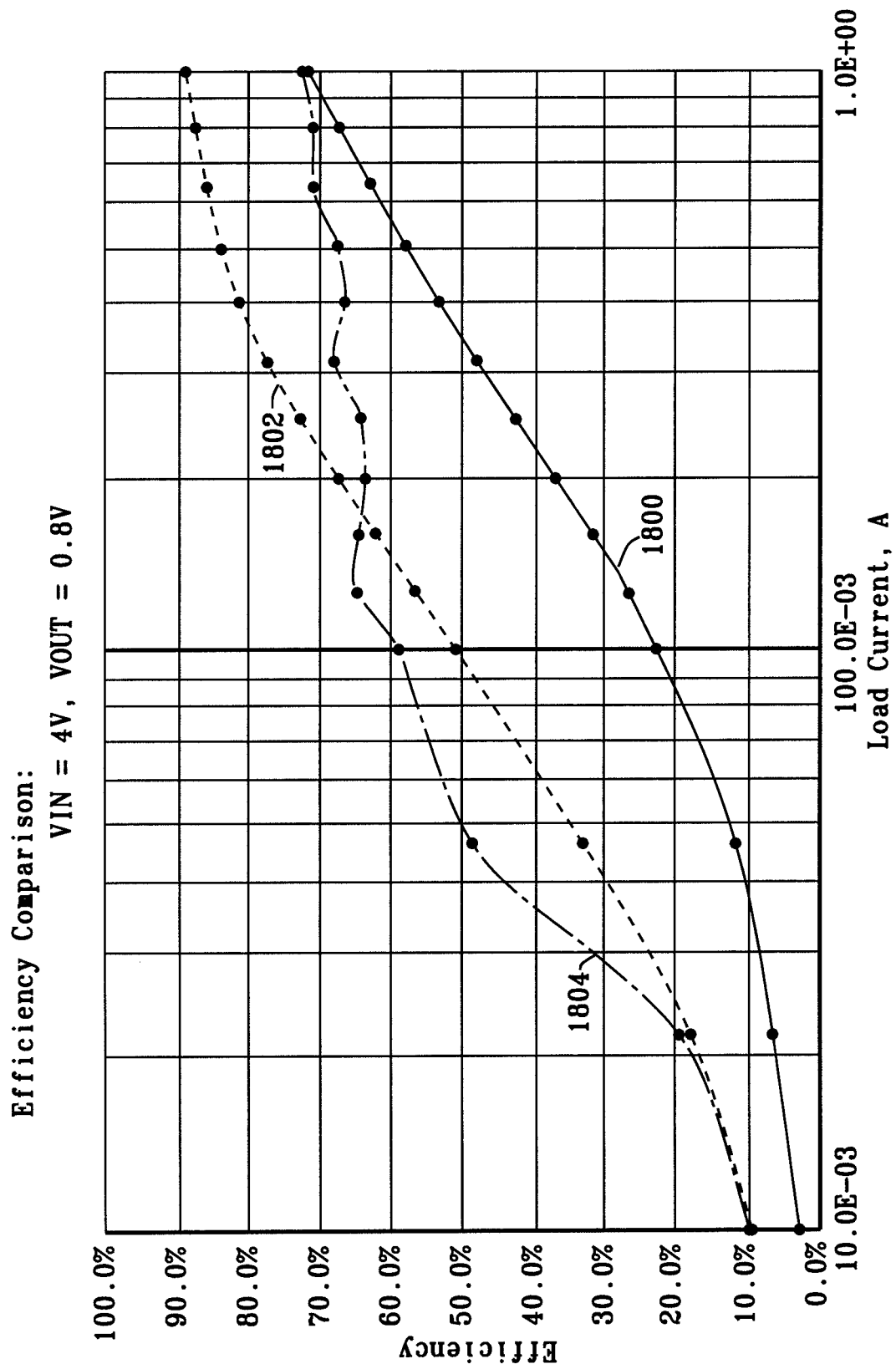
FIG. 18 is a graph showing simulation results for a 2-level buck converter of the prior art, the buck converter of the present disclosure using the regulation loop circuit and the buck converter of FIG. 2.

FIG. 18 is a graph showing simulation results for a 2-level buck converter of the prior art, the buck converter 300 of the present disclosure and using the regulation loop circuit 302 and the buck converter 200 using the COT control scheme. Shown in FIG. 18 are the efficiencies of the 2-level buck converter (labelled 1800), the buck converter 300 (labelled 1802) and the buck converter 200 (labelled 1804). The same power switch model was used for all three cases. In the present simulations, the input voltage VIN is 4V and the output voltage VOUT is 0.8V.

FIG. 19 is a table showing the simulation parameters used for the simulations of FIG. 18. The following parameters are shown: inductor inductance (1902), the equivalent series resistance (ESR) of the battery providing the input voltage (1904), the input capacitance and ESR (1906), the output capacitance on ESR (1908), the first flying capacitor capacitance and ESR (1910), the second flying capacitor capacitance and ESR (1912), the on resistance of the switches (1914), the switching period Tsw (1916) and the switch on time Ton (1918)

FIG. 18 shows that the buck converter 300 using the regulation loop circuit 302 of the present disclosure scheme has the highest efficiency for the high load current range, whereas the buck converter 200 using COT has the best efficiency for the mid-range of load currents. Both of the buck converter 200 and the buck converter 300 are more efficient over the entire range than the conventional 2-level buck even though the 2-level buck has the lowest conduction loss.

In a further embodiment, there may be provided a control scheme that combines the control schemes of the buck converter 200 and the buck converter 300 using the regulation loop circuit 302.

For example, such an embodiment would use the buck converter 200 control scheme for load currents below a certain threshold (~180 mA in the FIG. 18 example) and the buck converter 300 control scheme provided by the regulation loop circuit 302 for load currents above the threshold.

The transition between the two control schemes may be referred to as a mode change. The analogy for a conventional 2-level converter would be to employ pulse frequency modulation (PFM) for light loads and forced pulse width modulation (FPWM) for heavy loads.

Such an embodiment may, for example, comprise a load current detector, that detects the load current and selects the appropriate control scheme for the buck converter depending on the measured load current. For example, if the load current is below a threshold, COT may be used for buck regulation and if the load current exceeds the threshold, the regulation loop circuit 302 of the present disclosure may be used for buck regulation. This would enable high efficiency for conversion ratios between 25% and 0% for both heavy load and light load.

The regulation loop circuit 302 described herein can control the buck converter 300 to provide a conversion ratio than can vary between 25% and 0%, whilst maintaining high efficiency performance for a heavy load.

Many applications require high power converters with step down ratios between 4:1 and 6:1 such as Intermediate Bus Converters (IBC) for servers in datacenters. IoT devices such as wearables require variable conversion ratios between 4:1 and 6:1. The regulation loop circuit 302 of the present disclosure could provide benefits in these applications when requiring conversion ratios between 25% and 0%.

Various improvements and modifications may be made to the above without departing from the scope of the disclosure.

What is claimed is:

1. A regulation loop circuit for a buck converter for receiving an input voltage at an input terminal and providing an output voltage at an output terminal, the buck converter comprising:
   a capacitive divider coupled to the input terminal and comprising a first capacitor, a second capacitor, and a plurality of switches; and
   an inductor comprising a first terminal coupled to the capacitive divider at a switching node, and a second terminal coupled to the output terminal; wherein:
   the regulation loop circuit is configurable to be coupled to the output terminal and a reference voltage, and to regulate the output voltage based on the reference voltage by:
      i) regulating a switching node voltage at the switching node by switching the buck converter through a plurality of phases, comprising a first phase, a second phase and a third phase by selectively operating the plurality of switches to provide a first capacitor voltage across the first capacitor and a second capacitor voltage across the second capacitor; and:
      ii) maintaining an approximately equal duration for each of the first phase, the second phase and the third phase with respect to each other irrespective of the reference voltage, wherein during the first phase, the second phase and the third phase the inductor is magnetized.

2. The regulation loop circuit of claim 1, wherein the inductor is magnetized when the switching node voltage is greater than the output voltage.

3. The regulation loop circuit of claim 1, wherein the plurality of phases comprises a fourth phase.

4. The regulation loop circuit of claim 3, wherein the inductor is demagnetized in the fourth phase.

5. The regulation loop circuit of claim 4, wherein the inductor is demagnetized when the switching node voltage is less than the output voltage.

6. The regulation loop circuit of claim 3, wherein:
   during the first phase a first terminal of the first capacitor is coupled to the input terminal, a second terminal of the first capacitor is coupled to a first terminal of the second capacitor, and a second terminal of the second capacitor is coupled to the switching node;
   during the second phase, the first terminal of the first capacitor is coupled to the first terminal of the second capacitor, the second terminal of the first capacitor is coupled to a voltage terminal, and the second terminal of the second capacitor is coupled to the switching node;
   during the third phase, the first terminal of the first capacitor is floating, the second terminal of the first capacitor is coupled to the voltage terminal, the first terminal of the second capacitor is coupled to the switching node and the second terminal of the second capacitor is coupled to the voltage terminal; and
   during the fourth phase, the first capacitor and the second capacitor have their first terminals floating and their second terminals coupled to the voltage terminal, and the switching node is coupled to the voltage terminal.

7. The regulation loop circuit of claim 6, wherein the regulation loop circuit is configured to switch the between phases in a sequence as follows:

the first phase, the fourth phase, the third phase, the fourth phase, the second phase, the fourth phase, the third phase and the fourth phase, wherein the sequence is repeated.

8. The regulation loop circuit of claim 1, wherein the second capacitor voltage is approximately equal to half of the first capacitor voltage.

9. The regulation loop circuit of claim 8, wherein the first capacitor voltage is approximately equal to half of the input voltage and the second capacitor voltage is approximately equal to a quarter of the input voltage.

10. The regulation loop circuit of claim 1, wherein the regulation loop circuit is configured to operate the buck converter in a constant current mode (CCM) or a constant conduction mode.

11. The regulation loop circuit of claim 1, configured to regulate the output voltage to be between approximately one quarter of the input voltage and zero volts.

12. The regulation loop circuit of claim 1, wherein the plurality of switches comprises:
a first switch, a second switch, a third switch, a fourth switch, a fifth switch, a sixth switch and a seventh switch; wherein:
a first terminal of the first capacitor is coupled to the input terminal via the first switch when the first switch is in a closed state and is coupled to a first terminal of the second capacitor via the second switch when the second switch is in a closed state;
a second terminal of the first capacitor is coupled to the first terminal of the second capacitor via the third switch when the third switch is in a closed state and is coupled to a voltage terminal via the fourth switch when the fourth switch is in a closed state;
the first terminal of the second capacitor is coupled to the switching node when via the fifth switch when the fifth switch is in a closed state; and
a second terminal of the second capacitor is coupled to the switching node via the sixth switch when the sixth switch is in a closed state and is coupled to the voltage terminal via the seventh switch when the seventh switch is in a closed state.

13. The regulation loop circuit of claim 1, wherein the regulation loop circuit is configured to provide a plurality of control signals, wherein each control signal is provided to at least one of the plurality of switches and each control signal is suitable for setting a state of a switch, thereby selectively operating the plurality of switches.

14. The regulation loop circuit of claim 13, comprising:
a pulse width modulation circuit configured to receive the output voltage and the reference voltage and to generate a pulse width modulation signal; and
control logic configured to receive the pulse width modulation signal and to generate a logic output signal, wherein the plurality of control signals is dependent on the logic output signal.

15. The regulation loop circuit of claim 14, wherein the pulse width modulation circuit comprises:
an error amplifier comprising a first input coupled to the output voltage terminal and comprising a second input coupled to the reference voltage;
a ramp generator for generating a ramp signal; and
a comparator comprising a first input coupled to the ramp generator and comprising a second input coupled to an output of the error amplifier; wherein:
the control logic receives the pulse width modulation signal from an output of the comparator.

16. The regulation loop circuit of claim 14, comprising gate driver circuitry configured to receive the logic output signal from an output of the control logic and to provide the plurality of control signals.

17. The regulation loop circuit of claim 14, wherein:
the regulation loop circuit is configured to receive a clock signal;
the first phase, the second phase and the third phase are initiated by the clock signal; and
the first phase, the second phase and the third phase are terminated by the pulse width modulation signal.

18. The regulation loop circuit of claim 14, wherein the plurality of phases comprises a fourth phase.

19. The regulation loop circuit of claim 18, wherein:
the regulation loop circuit is configured to receive a clock signal; and
the fourth phase is initiated by the pulse width modulation signal and terminated by the clock signal.

20. The regulation loop circuit of claim 18, wherein:
the regulation loop circuit is configured to receive a clock signal from a clock generator;
the first phase, the second phase and the third phase are initiated by the clock signal;
the first phase, the second phase and the third phase are terminated by the pulse width modulation signal; and
the fourth phase is initiated by the pulse width modulation signal and terminated by the clock signal.

21. The regulation loop circuit of claim 20, wherein:
the ramp generator comprises a latch circuit comprising a set input coupled to the output of the comparator and a reset input coupled the clock generator for receiving the clock signal;
wherein the latch circuit provides an output that resets the ramp signal when the pulse width modulation signal switches to a high state and triggers the ramp signal when the clock signal switches to a high state.

22. A buck converter for receiving an input voltage at an input terminal and providing an output voltage at an output terminal, the buck converter comprising:
a capacitive divider coupled to the input terminal and comprising a first capacitor, a second capacitor, and a plurality of switches;
an inductor comprising a first terminal coupled to the capacitive divider at a switching node, and a second terminal coupled to the output terminal; and:
a regulation loop circuit that is configurable to be coupled to the output terminal and a reference voltage, and to regulate the output voltage based on the reference voltage by:
i) regulating a switching node voltage at the switching node by switching the buck converter through a plurality of phases, comprising a first phase, a second phase and a third phase by selectively operating the plurality of switches to provide a first capacitor voltage across the first capacitor and a second capacitor voltage across the second capacitor; and:
ii) maintaining an approximately equal duration for each of the first phase, the second phase and the third phase with respect to each other irrespective of the reference voltage, wherein during the first phase, the second phase and the third phase the inductor is magnetized.

23. A method of regulating a buck converter for receiving an input voltage at an input terminal and providing an output voltage at an output terminal, using a regulation loop circuit, the buck converter comprising:

a capacitive divider coupled to the input terminal and comprising a first capacitor, a second capacitor, and a plurality of switches; and an inductor comprising a first terminal coupled to the capacitive divider at a switching node, and a second terminal coupled to the output terminal; wherein the method comprises:

regulating the output voltage based on the reference voltage by:
  i) regulating a switching node voltage at the switching node by switching the buck converter through a plurality of phases, comprising a first phase, a second phase and a third phase by selectively operating the plurality of switches to provide a first capacitor voltage across the first capacitor and a second capacitor voltage across the second capacitor; and:
  ii) maintaining an approximately equal duration for each of the first phase, the second phase and the third phase with respect to each other irrespective of the reference voltage, wherein during the first phase, the second phase and the third phase the inductor is magnetized.

* * * * *